United States Patent
Fathallah et al.

(10) Patent No.: US 12,121,772 B2
(45) Date of Patent: Oct. 22, 2024

(54) SYSTEMS AND METHODS FOR FORMULATING A PERFORMANCE METRIC OF A MOTION OF A SWIMMER

(71) Applicant: Omnibus 157 Pty Limited, Sydney (AU)

(72) Inventors: Michel Fathallah, Glenfield (AU); Michael Potas, Earlwood (AU); Stuart May, Enmore (AU)

(73) Assignee: OMNIBUS 157 PTY LIMITED, Sydney (AU)

( * ) Notice: Subject to any disclaimer, the term of this patent is extended or adjusted under 35 U.S.C. 154(b) by 778 days.

(21) Appl. No.: 17/050,674

(22) PCT Filed: Apr. 26, 2019

(86) PCT No.: PCT/AU2019/050370
§ 371 (c)(1),
(2) Date: Oct. 26, 2020

(87) PCT Pub. No.: WO2019/204876
PCT Pub. Date: Oct. 31, 2019

(65) Prior Publication Data
US 2021/0220702 A1 Jul. 22, 2021

(30) Foreign Application Priority Data
Apr. 26, 2018 (AU) ................ 2018901377

(51) Int. Cl.
*A63B 31/10* (2006.01)
*A63B 24/00* (2006.01)
(Continued)

(52) U.S. Cl.
CPC ...... *A63B 24/0062* (2013.01); *A63B 24/0006* (2013.01); *A63B 31/02* (2013.01);
(Continued)

(58) Field of Classification Search
CPC . A63B 24/0003; A63B 24/0062; A63B 31/08; A63B 31/10
See application file for complete search history.

(56) References Cited

U.S. PATENT DOCUMENTS 4,654,010 A * 3/1987 Havriluk ................ A63B 24/00
455/100
5,258,927 A * 11/1993 Havriluk ................ A63B 24/00
702/139

(Continued)

FOREIGN PATENT DOCUMENTS

CN 204579983 U 8/2015
CN 104977356 A 10/2015

(Continued)

OTHER PUBLICATIONS

International Searching Authority, International Search Report and Written Opinion for International Application No. PCT/AU2019/050370, dated Jul. 15, 2019, Australian Patent Office, Woden Act Australia.

(Continued)

*Primary Examiner* — Kurt Fernstrom
(74) *Attorney, Agent, or Firm* — Alston & Bird LLP

(57) ABSTRACT

A system for formulating a performance metric of a motion such as water sport motion, preferable a swimming stroke, includes a wearable sensor device including 4 pressure sensors, a 9 degrees of freedom inertial measurement unit (IMU), a microprocessor communicating with the pressure sensors and the IMU, and waterproof housing in the form of a flexible silicone band to house the microprocessor, the pressure sensors and the IMU. The system includes an external computer communicating with the device for receiving and combining input data from each of the pressure sensors and the IMU, via the microprocessor, and a processing unit configured to combine the input data from (Continued)

both the at least one pressure sensor and the IMU. The input data is used to infer at least one force magnitude and at least one force direction, the input data being used to provide the performance metric of the water sport motion.

18 Claims, 37 Drawing Sheets

(51) Int. Cl.
    *A63B 31/02*     (2006.01)
    *A63B 69/12*     (2006.01)
(52) U.S. Cl.
    CPC ............. *A63B 31/10* (2013.01); *A63B 69/12* (2013.01); *A63B 2220/40* (2013.01); *A63B 2220/51* (2013.01); *A63B 2220/56* (2013.01); *A63B 2220/836* (2013.01); *A63B 2244/20* (2013.01)

(56) References Cited

U.S. PATENT DOCUMENTS

| | | | |
|---|---|---|---|
| 5,663,897 A * | 9/1997 | Geiser | A63B 71/0686 |
| | | | 702/182 |
| 6,183,396 B1 | 2/2001 | Reynier | |
| 6,955,542 B2 * | 10/2005 | Roncalez | A63B 71/06 |
| | | | 434/254 |
| 8,406,085 B2 * | 3/2013 | Sakita | G07C 1/22 |
| | | | 368/110 |
| 8,821,305 B2 * | 9/2014 | Cusey | A61B 5/22 |
| | | | 340/539.22 |
| 8,923,994 B2 | 12/2014 | Laikari et al. | |
| 8,988,240 B2 * | 3/2015 | Burton | G01C 23/00 |
| | | | 348/157 |
| 9,773,330 B1 * | 9/2017 | Douglas | G06F 3/14 |
| 10,022,087 B2 * | 7/2018 | Holopainen | G06V 40/23 |
| 10,080,922 B2 | 9/2018 | Davis et al. | |
| 10,139,392 B2 | 11/2018 | Kääriäinen et al. | |
| 10,220,255 B2 * | 3/2019 | Copelan | A61B 5/4528 |
| 10,254,804 B2 * | 4/2019 | Dusan | G06F 1/163 |
| 10,786,719 B2 * | 9/2020 | Ting | A61B 5/1116 |
| 11,125,638 B2 * | 9/2021 | Rival | G01L 13/06 |
| 2003/0138763 A1 * | 7/2003 | Roncalez | A63B 71/06 |
| | | | 434/254 |
| 2008/0018532 A1 | 1/2008 | Mackintosh et al. | |
| 2010/0030482 A1 | 2/2010 | Li | |
| 2010/0093458 A1 | 4/2010 | Davenport et al. | |
| 2010/0210975 A1 * | 8/2010 | Anthony, III | A61B 5/1123 |
| | | | 600/595 |
| 2012/0009553 A1 * | 1/2012 | Ben-Tal | A63B 71/0622 |
| | | | 434/254 |
| 2014/0171268 A1 | 6/2014 | Frolov | |
| 2014/0200116 A1 | 7/2014 | Boutov et al. | |
| 2014/0277628 A1 | 9/2014 | Nieminen et al. | |
| 2015/0106052 A1 | 4/2015 | Balakrishnan et al. | |
| 2016/0007888 A1 | 1/2016 | Nieminen et al. | |
| 2016/0045159 A1 | 2/2016 | Balakrishnan et al. | |
| 2016/0144234 A1 * | 5/2016 | Yang | A61B 5/11 |
| | | | 434/254 |
| 2016/0223580 A1 | 8/2016 | Balakrishnan et al. | |
| 2016/0263438 A1 | 9/2016 | Donohoe | |
| 2017/0043212 A1 | 2/2017 | Wong et al. | |
| 2017/0061817 A1 * | 3/2017 | Mettler May | A61B 5/1123 |
| 2017/0128808 A1 * | 5/2017 | Auvinen | A63B 69/12 |
| 2017/0319904 A1 | 11/2017 | Deochand et al. | |
| 2018/0056129 A1 * | 3/2018 | Narasimha Rao | A61B 5/7221 |
| 2018/0200579 A1 * | 7/2018 | Davis | A63B 69/12 |
| 2019/0250057 A1 * | 8/2019 | Rival | G01L 13/06 |
| 2019/0269968 A1 * | 9/2019 | Eisenhardt | A61B 5/725 |
| 2021/0069567 A1 | 3/2021 | Ko et al. | |
| 2021/0170227 A1 | 6/2021 | Niehaus et al. | |

FOREIGN PATENT DOCUMENTS

| | | | |
|---|---|---|---|
| CN | 204988293 U | 1/2016 | |
| CN | 106912006 A | 6/2017 | |
| CN | 107270934 A | 10/2017 | |
| CN | 108392811 A | 8/2018 | |
| DE | 20306128 U1 | 8/2003 | |
| DE | 10206345 B3 | 1/2004 | |
| EP | 1623743 A1 | 2/2006 | |
| GB | 2511833 B | 1/2016 | |
| GB | 2545191 A | 6/2017 | |
| JP | 2016-198194 A | 12/2016 | |
| SU | 1556653 A1 | 4/1990 | |
| WO | WO 2010/090867 A2 | 8/2010 | |
| WO | WO-2011/067421 A1 | 6/2011 | |
| WO | WO-2013/083278 A2 | 6/2013 | |
| WO | WO-2015/175838 A1 | 11/2015 | |
| WO | WO-2017/013570 A1 | 1/2017 | |
| WO | WO-2017/163108 A1 | 9/2017 | |
| WO | WO 2018/045211 A1 | 3/2018 | |
| WO | WO 2019/199183 A2 | 10/2019 | |

OTHER PUBLICATIONS

Kudo, Shigetada et al. *Prediction of Fluid Forces Acting on a Hand Model in Unsteady Flow Conditions*, Journal of Biomechanics, vol. 41, No. 5, (2008), pp. 1131-1136.

Kudo, Shigetada et al. *The Effect of Unsteady Flow Due to Acceleration on Hydrodynamic Forces Acting on the Hand in Swimming*, Journal of Biomechanics, vol. 46, pp. 1697-1704, (2013). doi: 10.1016/j.jbiomech.2013.04.002. Epub May 17, 2013.

Takagi, Hideki et al. *Numerical and Experimental Investigations of Human Swimming Motions*, Journal of Sports Sciences, vol. 34, No. 16, pp. 1564-1580, (2016). DOI: 10.1080/02640414.2015.1123284.

Van Houwelingen, Josje et al. *Effective Propulsion in Swimming: Grasping the Hydrodynamics of Hand and Arm Movements*, Journal of Applied Biomechanics, vol. 33, No. 1, pp. 87-100, (2017).

Matsuda, Yuji et al. *How Elite Swimmers Control Their Hand Propulsive Force and Arm Coordination With Increasing Velocity During Front Crawl*, 34th International Conference on Biomechanics in Sports, Jul. 18-22, pp. 819-822, (2016), Tsukuba, Japan.

Warmenhoven, et al., "Bivariate Functional Principal Components Analysis: Considerations for use with Multivariate Movement Signatures in Sports Biomechanics", *Sports Biomechanics*, vol. 18, pp. 10-27, (2019), doi.org/10.1080/14763141.2017.1384050.

Smith, et al., "Discriminant Analysis of Biomechanical Differences Between Novice, Good and Elite Rowers", *Journal of Sports Sciences*, vol. 13, pp. 377-385, (1995), doi.org/10.1080/02640419508732253.

Farley, et al., "Five Weeks of Sprint and High-Intensity Interval Training Improves Paddling Performance in Adolescent Surfers", *Journal of Strength and Conditioning Research*, vol. 30(9), pp. 2446-2452. Sep. 2016, DOI: 10.1519/JSC.0000000000001364.

Ganzevles, et al., "Differences in Swimming Smoothness Between Elite and Non-Elite Swimmers", *Sports Biomechanics*, vol. 22:5, pp. 675-688, Aug. 30, 2019, DOI: 10.1080/14763141.2019.1650102.

Mooney, et al., "Inertial Sensor Technology for Elite Swimming Performance Analysis: A Systematic Review", *Sensors*, (55 pages), Dec. 25, 2015, doi:10.3390/s16010018.

Warmenhoven, et al., "Over 50 Years of Researching Force Profiles in Rowing: What Do We Know?", *Sports Medicine*, vol. 48, pp. 2703-2714, Oct. 8, 2018, doi.org/10.1007/s40279-018-0992-3.

Magalhaes, et al., "Wearable Inertial Sensors in Swimming Motion Analysis: a Systematic Review", *Journal of Sports Sciences*, Nov. 10, 2014, (14 pages), doi.org/10.1080/02640414.2014.962574.

Kudo, et al., "Prediction of Fluid Forces Acting on a Hand Model in Unsteady Flow Conditions", *ISBS*, (4 pages), 2015.

* cited by examiner

SYSTEMS AND METHODS FOR FORMULATING A PERFORMANCE METRIC OF A MOTION OF A SWIMMER

CROSS REFERENCE TO RELATED APPLICATIONS

This application is a National Stage Application, filed under 35 U.S.C. § 371, of International Application No. PCT/AU2019/050370, filed Apr. 26, 2019, which claims priority to Australian Application No. 2018901377, filed Apr. 26, 2018; the contents of both of which are hereby incorporated by reference in their entirety.

BACKGROUND

Related Field

The present invention relates to systems and methods for formulating a performance metric of a motion of a user and in particular for applications in water sports, in particular swimming. The invention includes a wearable device and associated software for collectively monitoring stroke technique. While some embodiments will be described herein with particular reference to that application, it will be appreciated that the invention is not limited to such a field of use, and is applicable in broader contexts.

Any discussion of the background art throughout the specification should in no way be considered as an admission that such art is widely known or forms part of common general knowledge in the field.

Wearable accessories for monitoring sports performance are well-known and popular amongst professional athletes. More recently, the emergence of less costly wearable devices for monitoring sports performance have brought such performance monitoring to everyday people. Traditionally, only basic tools were available such as stop watches, stroke counting and heart rate monitoring which provides insight only on outcome, not input and effort.

Looking more specifically at water sports, it is becoming increasingly common for water sport athletes of all skill levels to measure and collect information related to their swimming performance. Swimmers and/or coaches of swimmers are able to use the collected information to assess areas of weakness and improve performance with an aim to reduce swimming lap times.

Swimming is inherently a complex motion. Performance is dependent on the resistive and propulsive forces on the body-system that an athlete generates. Resistive forces include various forms of drag (like friction, pressure and wave drag) that act opposite the forward direction of the athlete and are usually dependent on form and technique. Propulsive forces, due to arms, feet and whole-body motions, act in various ways depending on which direction the athlete is exerting effort. However, ultimately, only the component of the effort in the forward direction will propel the athlete forward in their desired direction.

By measuring the effort carried out by the athlete quantitatively as a vector, whether it be in force, power, pressure or some other related metric, a true performance and effort efficiency metric can be derived, one that relates total output effort by the athlete in all directions, to effort that only propels the swimmer in their desired direction. Other performance metrics related to efficiency that may better inform a swimmer of their technique can be derived from the metrics of total effort, and effort only in the desired direction, when they are compared to other metrics available such as speed, stroke rate, time and distance per stroke.

By monitoring and analysing the propulsive and resistive forces, and metrics such as those mentioned above, swimmers could increase speeds by minimising their resistive forces, and increasing and optimising propulsive force magnitude and direction.

There are various known techniques for measuring propulsive forces. These include attaching a rope to a swimmer, using video systems, using controlled-flow water channels, and out-of-pool machinery. Such known systems are not easily portable, and are costly and often require trained specialists to operate. These systems are usually tailored towards biomechanists. As such, these installations are usually only installed and used at state-of-the-art training centres for elite athletes.

Other known techniques for measuring propulsive forces include using wearable personal devices that do not suffer from the limitations of the installations mentioned above. These methods explore the use of pressure sensors on a swimmer's hand to evaluate the propulsive forces generated at the hand level.

The kinetics and kinematics involved in swimming are very complex. While most coaches can identify swimmers' mistakes in terms of technique visually (which is labour and time intensive and only provides qualitative feedback on only gross error), the more nuanced technique mistakes can be harder to identify and require some of the aforementioned installations. Coaches rarely apply the use of these installations, not only because they are cumbersome and expensive, but also because it usually takes a biomechanist to analyse and comprehend the data captured.

Known devices use pressure sensors on the hand to estimate force, with a focus on using a multitude of pressure sensors around the hands to get a force estimate of magnitude. In some instances, known devices also use separate sensors to monitor direction.

DESCRIPTION OF RELATED ART

U.S. Pat. No. 4,654,010 discloses a method and device for measuring swimming technique that utilises a pressure transducer mounted to the hand of a swimmer. The system measures the pressure differential between the palm and the back of the swimmer's hand. The data is plotted against time and the area under the curve gives a measurement of the swimming 'effectiveness'. This is essentially a measure of sustained force output over time and does not quantify effectiveness of the swimming in relation to the forward direction.

U.S. Pat. No. 5,663,897 discloses a method and apparatus of measuring swim performance and swim stroke efficiency on a hand-mounted device that can be worn during swimming. The performance and efficiency metrics include, but are not limited to, stroke rate, cycle time, distance, and velocity. The invention discloses the use of a force-responsive membrane that completes a circuit which allows for the counting of strokes. The invention does not disclose any continuous scalar or vector measurement of the forces generated by a swimmer.

U.S. Pat. No. 6,183,396 discloses a palm plate designed to be attached to the hand of a swimmer. The plate is equipped with at least one pressure sensor that transmits a signal to a microprocessor capable of calculating the supporting force, number of arm cycles, forces produced, calories spent, water temperature, and pulse, all of which can be displayed on a read-out screen. The invention does not disclose any measurement of the direction of the forces produced.

US Patent Application 2010/0210975 discloses systems and methods for monitoring performance of a variety of activities, including swimming. The invention involves a primary, or optionally additional secondary devices or third party devices, for sensing the characteristics of the performance of an activity or the environment in which it is performed. There is no direct disclosure of using pressure sensors to calculate the magnitude or direction of forces on the swimmer's body.

U.S. Pat. No. 8,406,085 discloses a swim device which includes a multiplicity of sensor units that are placed on a wrist, hand and foot. The wrist unit includes at least one pressure sensor and the hand/foot includes at least one pressure sensor that is attached to a cap that is worn on the first segment of a finger or big toe. The aim of the invention is to measure elapsed time and count the number of laps in a session. The invention discloses the presentation of the pressure information to the user but since it has no inertial or positional sensor, it does not provide any directional information of the pressure.

US Patent Application 2014/0277628 discloses a method and device that comprises of one or more motion-sensitive sensors that can be used for determination of a swimmer's turns, distance swum, or swimming style, among others. There is no disclosure of measurement of the effort exerted by a swimmer.

Kudo et al "Prediction of fluid forces acting on a hand model in unsteady flow conditions" Journal of Biomechanics 41.5 (2008): 1131-1136, discusses a method to predict the fluid forces acting on a human hand in unsteady flow swimming conditions. A mechanical system is used to rotate a hand model through water. The forces on the hand were measured and correlated to 12 pressure transducers, which were attached to the hand at various points, through high order polynomial equations. There is no disclosure of the monitoring and factoring in of directional data into the forces estimated.

US Patent Application 2017/0043212 discloses a system including a small paddle device that fits across the fingers or palm of a swimmer's hand and provides real-time measurement and analysis on an athlete's motion through computer software.

However, this device does not disclose the use of both pressure sensors and directional data to be factored into the forces measured.

US Patent Application 2017/0128808 discloses a system including a force-sensing wearable device that is strapped around the swimmer's hand or around a paddle and measures the force exerted on the water. However, this product also does not disclose the use of both pressure sensors and directional data to be factored into the forces measured.

BRIEF SUMMARY

It is desirable to monitor sporting performance using devices that are convenient to use, and that provide accurate data. It is an object of the present invention to overcome or ameliorate at least one of the disadvantages of the prior art, or to provide a useful alternative.

In accordance with a first aspect of the present invention there is provided a system for formulating a performance metric of a motion of a user, the system including:

a wearable sensor device including at least one pressure sensor, an inertial measurement unit (IMU), a microprocessor in communication with the at least one pressure sensor and the IMU, and at least one housing to house the microprocessor, the at least one pressure sensor and the IMU;

an external unit in communication with the wearable sensor device for receiving input data from both the at least one pressure sensor and the IMU, via the microprocessor, wherein the input data from both the at least one pressure sensor and the IMU is combined and the combined input data is used to infer at least one force magnitude or at least one force direction, the at least one force magnitude and the at least one force direction being processed to provide the performance metric.

In an embodiment, the combined input data is used to infer both the at least one force magnitude and the at least one force direction. In a further embodiment, the combining of the input data from both the at least one pressure sensor and the IMU is carried out by the external unit.

In an alternate embodiment, the combining of the input data from both the at least one pressure sensor and the IMU is carried out by the microprocessor. In another embodiment, the combining of the input data from both the at least one pressure sensor and the IMU is carried out by the external unit or microprocessor.

In an embodiment, the performance metric is calculated by assessing the proportion of force magnitude that is in a forward direction. In a further embodiment, assessing the proportion of force magnitude that is in the forward direction includes augmenting pressure data from the at least one pressure sensor with inertial data from the IMU.

In another embodiment, the performance metric is calculated by assessing an inverse of a time interval multiplied with a total impulse over all global axes. In a further embodiment, the performance metric is calculated by assessing an inverse of a time interval multiplied with a total impulse over all global axes and applying normalisation and scaling.

In an embodiment, the at least one force magnitude or the at least one force direction are calculated from a drag force and a first lift force.

In an embodiment, the at least one force magnitude and the at least one force direction are each calculated from a drag force and a first lift force.

In an embodiment, the at least one force magnitude or the at least one force direction are calculated from a drag force, a first lift force and a second lift force. In another embodiment, the at least one force magnitude and the at least one force direction are each calculated from a drag force, a first lift force and a second lift force.

In an embodiment, the wearable sensor device includes at least two pressure sensors. In a further embodiment, the wearable sensor device is adapted to be worn on the user's hand. In a yet further embodiment, the wearable sensor device is adapted to wrapped around the user's palm. In another embodiment, the wearable sensor device is adapted to be worn on the user's hand or wrapped around the user's palm. In an embodiment, the at least two pressure sensors are, in use, disposed adjacent the palm and the dorsal side of the hand. In an alternate embodiment, the at least two pressure sensors are, in use, disposed on orthogonal surfaces of the wearable sensor device. In an alternate embodiment, the wearable sensor device includes an outward facing external surface and the at least two pressure sensors are, in use, disposed on opposing outward surfaces of the external surface.

In an embodiment, the wearable sensor device includes at least four pressure sensors.

In an embodiment, the wearable sensor device is adapted to be worn on the user's wrist. In an alternate embodiment, the wearable sensor device is adapted to be worn on the user's foot. In an alternate embodiment, the wearable sensor device is adapted to be worn on the user's torso. In an alternate embodiment, the wearable sensor device is adapted to be worn on the user's back. In an alternate embodiment, the wearable sensor device is adapted to be worn on the user's hip. In an alternate embodiment, the wearable sensor device is adapted to be worn on the user's head. In another embodiment, the wearable sensor device is adapted to be worn on at least one from the group of the user's wrist, foot, torso, back, hip and head.

In an embodiment, inertial data from the IMU is at least partially used to devise a forward direction.

In an embodiment, the external unit is a smart phone. In an embodiment, the smart phone includes software for analysing the input data to produce the performance metric. In a further embodiment, the wearable sensor device communicates with the smart phone wirelessly. In a yet further embodiment, the wearable sensor device includes a Bluetooth transceiver and the wireless communication is by way of Bluetooth. In a yet further embodiment, the Bluetooth transceiver includes ANT+ hardware and the wireless communication is also by way of ANT+ protocol.

In an embodiment, the external unit is housed within the at least one housing of the wearable sensor device. In an alternate embodiment, the external unit is separate to the wearable sensor device and is one of the group including: a smart watch, a computer, and an external wearable training aid.

In an embodiment, the IMU includes one or more from the group consisting of: an accelerometer; a gyroscope, and a magnetometer. In another embodiment, the IMU includes an accelerometer; a gyroscope, and a magnetometer.

In an embodiment, the wearable sensor device includes a plurality of IMUs.

In an embodiment, the wearable sensor device includes a digital display. In a further embodiment, the display is an organic light-emitting diode (OLED) display.

In an embodiment, the system includes a plurality of wearable sensor devices worn on different parts of the body. In a further embodiment, the plurality of wearable sensor devices are in wireless communication with each other.

In an embodiment, the wearable sensor device includes a plurality of housings, each housing to house one or more of the microprocessor, the at least one pressure sensor and the IMU. In a further embodiment, the wearable sensor device includes a plurality of pressure sensors and each of the plurality of pressure sensor is housed in a separate one of the plurality of housings. In a yet further embodiment, the plurality of housings are mounted at different locations on the user.

In an embodiment, the motion is a water sports motion. In a more preferred embodiment, the water sports motion is a swimming stroke.

In an embodiment, the housing is substantially waterproof.

In a further embodiment, the system includes a display for graphically displaying a motion force of the user, wherein the motion force of the user is displayed in a 360° polar plot.

In accordance with a second aspect of the present invention there is provided a method for formulating a performance metric for a motion of a user, the method including:
(a) creating a model of forces based a plurality of input variables taken from an ideal rig setup;
(b) disposing a wearable sensor device on a user for use whilst engaging in a motion;
(c) receiving from a wearable sensor device input data correlated with the input variables;
(d) calculating a force estimate based on applying the wearable sensor device input data to the model of forces;
(e) calculating a performance metric of the motion based on the force estimate.

In an embodiment, the calculations of the method may be performed on a microprocessor. Alternatively, the calculations of the method may be performed on an external unit. In further embodiments, the calculations of the method may be performed on a microprocessor or an external unit. In an embodiment, the received input data includes inertial measurement unit (IMU) data and the performance metric is based on the force estimate and the IMU data.

In an embodiment, step (e) includes: inputting a forward direction of movement; rotating the force estimate relative to the forward direction of movement; and calculating the portion of the force estimate that is in the forward direction of movement, wherein the performance metric is based on this portion of the force estimate in the forward direction of movement.

In an embodiment, the model is created using one or more statistical modelling techniques. In a further embodiment, the one or more statistical modelling techniques includes regression analysis modelling. In a yet further embodiment, the regression analysis modeling includes one or more of the group consisting of: linear regression model; multiple linear regression model; polynomial regression model; nonlinear regression model; and nonparametric regression model.

In an embodiment, the one or more statistical modelling techniques includes one or more of the group consisting of: decision tree regression; K-nearest neighbor algorithms; artificial neural networks; and support vector machines.

In an embodiment, after step (c), there includes the further step of entering specific user variables into the model of forces. In a further embodiment, the specific user variables includes one or more of the group including: hand size; finger spread; and degree of cupping.

In accordance with a third aspect of the present invention there is provided a system for formulating a performance metric of a swimming stroke, the system including:
a waterproof wearable sensor device including at least one pressure sensor, an inertial measurement unit (IMU), a microprocessor in communication with the at least one pressure sensor and the IMU, and a waterproof housing to house the microprocessor, the at least one pressure sensor and the IMU;
an external unit in communication with the wearable sensor device for receiving input data from both the at least one pressure sensor and the (IMU), via the microprocessor, wherein the input data is used to infer at least one force magnitude or at least one force direction, the input data being processed to provide the performance metric.

In an embodiment, the combined input data is used to infer both the at least one force magnitude and the at least one force direction. In a further embodiment, the combining of the input data from both the at least one pressure sensor and the IMU is carried out by the external unit.

In an alternate embodiment, the combining of the input data from both the at least one pressure sensor and the IMU is carried out by the microprocessor.

In an embodiment, the performance metric is calculated by assessing the proportion of force magnitude that is in a forward direction. In a further embodiment, assessing the proportion of force magnitude that is in the forward direction includes augmenting pressure data from the at least one pressure sensor with inertial data from the IMU.

In an embodiment, the at least one force magnitude or the at least one force direction are calculated from a drag force and a first lift force.

In an embodiment, the at least one force magnitude and the at least one force direction are each calculated from a drag force and a first lift force.

In an embodiment, the at least one force magnitude or the at least one force direction are calculated from a drag force, a first lift force and a second lift force. In another embodiment, the at least one force magnitude and the at least one force direction are each calculated from a drag force, a first lift force and a second lift force.

In an embodiment, the wearable sensor device includes at least two pressure sensors. In a further embodiment, the wearable sensor device is adapted to be worn on the user's hand. In a yet further embodiment, the wearable sensor device is adapted to wrapped around the user's palm. In an embodiment, the at least two pressure sensors are, in use, disposed adjacent the palm and the dorsal side of the hand. In an alternate embodiment, the at least two pressure sensors are, in use, disposed on orthogonal surfaces of the wearable sensor device. In an alternate embodiment, the wearable sensor device includes an outward facing external surface and the at least two pressure sensors are, in use, disposed on opposing outward surfaces of the external surface.

In an embodiment, the wearable sensor device includes at least four pressure sensors.

In an embodiment, the wearable sensor device is adapted to be worn on the user's wrist. In an alternate embodiment, the wearable sensor device is adapted to be worn on the user's foot. In an alternate embodiment, the wearable sensor device is adapted to be worn on the user's torso. In an alternate embodiment, the wearable sensor device is adapted to be worn on the user's back. In an alternate embodiment, the wearable sensor device is adapted to be worn on the user's hip. In an alternate embodiment, the wearable sensor device is adapted to be worn on the user's head.

In an embodiment, inertial data from the IMU is at least partially used to devise a forward direction. In another embodiment, magnetic data from the IMU is at least partially used to devise a forward direction. In further embodiments, a combination of inertial data and magnetic data may be at least partially used to devise a forward direction.

In an embodiment, the external unit is a smart phone. In an embodiment, the smart phone includes software for analysing the input data to produce the performance metric. In a further embodiment, the wearable sensor device communicates with the smart phone wirelessly. In a yet further embodiment, the wearable sensor device includes a Bluetooth transceiver and the wireless communication is by way of Bluetooth. In a yet further embodiment, the Bluetooth transceiver includes ANT+ hardware and the wireless communication is also by way of ANT+ protocol.

In an embodiment, the external unit is housed within the at least one housing of the wearable sensor device. In an alternate embodiment, the external unit is separate to the wearable sensor device and is one of the group including: a smart watch, a computer, a tablet and an external wearable training aid.

In an embodiment, the IMU includes one or more from the group consisting of: an accelerometer; a gyroscope, and a magnetometer. In another embodiment, the IMU includes an accelerometer; a gyroscope, and a magnetometer.

In an embodiment, the wearable sensor device includes a plurality of IMUs.

In an embodiment, the wearable sensor device includes a digital display. In a further embodiment, the display is an organic light-emitting diode (OLED) display.

In an embodiment, the system includes a plurality of wearable sensor devices worn on different parts of the body. In a further embodiment, the plurality of wearable sensor devices are in wireless communication with each other.

In an embodiment, the wearable sensor device includes a plurality of housings, each housing to house one or more of the microprocessor, the at least one pressure sensor and the IMU. In a further embodiment, the wearable sensor device includes a plurality of pressure sensors and each of the plurality of pressure sensor is housed in a separate one of the plurality of housings. In a yet further embodiment, the plurality of housings are mounted at different locations on the user.

In accordance with a fourth aspect of the present invention there is provided a method for calculating and displaying a motion force of a user including the steps of:
  receiving orientation data from both at least one pressure sensor and an inertial measurement unit (IMU) placed on the user;
  calibrating and/or filtering the orientation data;
  based on the calibrated and/or filtered orientation data, estimating at least one motion force on the user;
  estimating a forward direction frame of reference of the user and rotating the estimated at least one motion force into the frame of reference;
  providing a 360° plot and segmenting the plot into a plurality (n) of bins; for the rotated estimated at least one motion force, calculating a corresponding direction of motion force in a chosen plane;
  based on the corresponding direction of motion force, accumulating the rotated estimated at least one motion force to the appropriate bin to produce graphical data;
  plotting the graphical data as a line graph; and
  transforming the line graph into a 360° polar plot graph thereby displaying the motion force of the user.

In an embodiment, a plurality of motions are concurrently plotted. In an embodiment, for each of the plurality of motions, the orientation data is received from one of a plurality of pressure sensors and one of a plurality of IMUs. In an embodiment, at least two of each of the plurality of pressure sensors and the plurality of IMUs are placed at two different locations on the user.

In accordance with a fifth aspect of the present invention there is provided a system for displaying a motion force of a user, the system including:
  a wearable sensor device including at least one pressure sensor, an inertial measurement unit (IMU), a microprocessor in communication with the at least one pressure sensor and the IMU, and at least one housing to house the microprocessor, the at least one pressure sensor and the IMU;
  an external unit in communication with the wearable sensor device for receiving input data from both the at least one pressure sensor and the IMU, via the microprocessor, wherein the input data from both the at least one pressure sensor and the IMU is combined and the combined input data is used to infer at least one force magnitude or at least one force direction, the at least one force magnitude and the at least one force direction being processed to provide the motion force of the user; and a display for graphically displaying the motion force of the user, wherein the motion force of the user is displayed in a 360° polar plot.

In an embodiment, a plurality of motions are concurrently plotted. In an embodiment, the system includes plurality of wearable sensor devices, wherein for each of the plurality of motions, the orientation data is received from one of the plurality of wearable sensor devices. In an embodiment, at least two of each of the plurality of wearable sensor devices are placed at two different locations on the user. In a further embodiment, the at least one housing is substantially waterproof.

In accordance with a sixth aspect of the present invention there is provided a system for displaying a motion force of a user, the system including:
  a wearable sensor device including at least one pressure sensor, an inertial measurement unit (IMU), a microprocessor in communication with the at least one pressure sensor and the IMU, and at least one housing to house the microprocessor, the at least one pressure sensor and the IMU;
  an external unit in communication with the wearable sensor device for receiving input data from both the at least one pressure sensor and the IMU, via the microprocessor, wherein the input data from both the at least one pressure sensor and the IMU is combined and the combined input data is used to infer at least one force magnitude or at least one force direction, the at least one force magnitude and the at least one force direction being processed to provide the motion force of the user; and
  a display for graphically displaying the motion force of the user in accordance with the plot types shown in FIGS. 19A and 20A.

In an embodiment, a pair of motions are concurrently plotted. In an embodiment, the system includes a pair of wearable sensor devices, wherein for each of the pair of motions, the orientation data is received from a respective one of the pair of wearable sensor devices. In an embodiment, each of the pair of wearable sensor devices are placed at two different locations on the user. In a further embodiment, the at least one housing is substantially waterproof.

In accordance with a seventh aspect of the present invention there is provided a method for providing a 360° polar plot graph for a plurality of forces each having a force magnitude and a force direction, the method including the steps of:
  providing a 360° plot and segmenting the plot into a plurality (n) of bins;
  for each of the plurality of forces, calculating a corresponding direction of motion force in a chosen plane based on each respective force direction;
  based on the direction of motion forces, accumulating into the appropriate bin the force magnitude for each of the plurality of forces to produce graphical data;
  plotting the graphical data as a line graph; and
  transforming the line graph into a 360° polar plot graph.

In an embodiment, a plurality of motions are concurrently plotted.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In accordance with an either aspect of the invention, there is provided a system for formulating a performance metric of a motion of a user, the system including:
  a wearable sensor device including at least one pressure sensor, an inertial measurement unit (IMU), a microprocessor in communication with the at least one pressure sensor and the IMU, and at least one housing to house the microprocessor, the at least one pressure sensor and the IMU;
  an external unit in communication with the wearable sensor device for receiving input data from both the at least one pressure sensor and the IMU, via the microprocessor; and
  a processing unit configured to combine the input data from both the at least one pressure sensor and the IMU and the combined input data is used to infer at least one force magnitude or at least one force direction, the at least one force magnitude and the at least one force direction being processed to provide the performance metric.

In further embodiments, the processing unit, configured to combine the input data from both the at least one pressure sensor and the IMU, forms at least a part of the external unit or the microprocessor. In one embodiment, the processing unit is part of the microprocessor. In another embodiment, the processing unit is part of the external unit. In alternative embodiments, the processing unit is separate from, but in communication with, the microprocessor and/or the external unit.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE FIGURES

Preferred embodiments of the disclosure will now be described, by way of example only, with reference to the accompanying drawings in which.

DETAILED DESCRIPTION OF VARIOUS EMBODIMENTS

Figure 1:
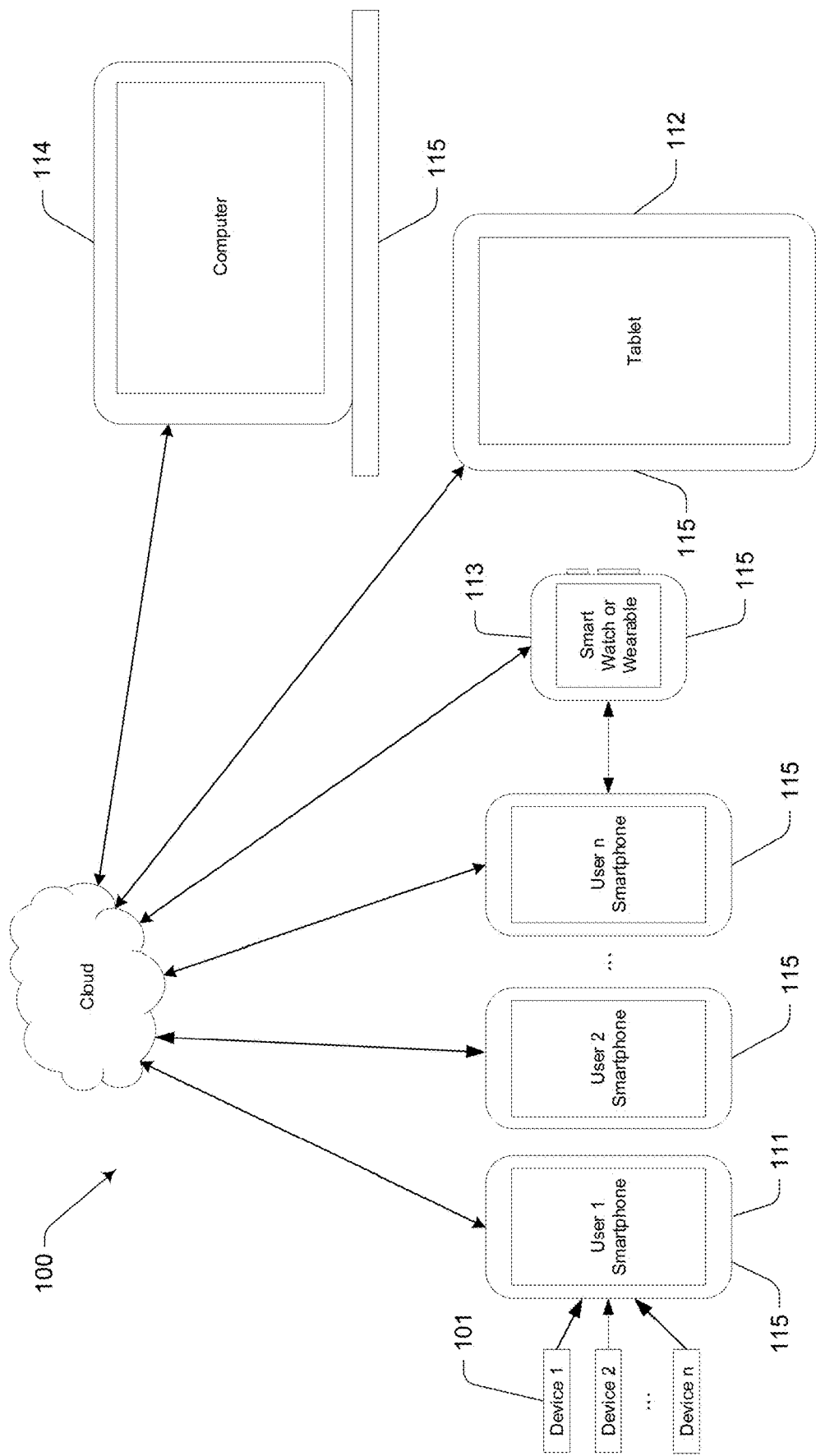
FIG. 1 is a conceptual block diagram of the system of the present invention.

Referring to FIG. 1 and FIGS. 3A to 3E, there is provided a system 100 for formulating a performance metric of a motion, preferably a water sport motion and more preferably a swimming stroke, of a user, preferably a swimmer. System 100 includes a wearable sensor device 101 including two pressure sensors 201 and 202, a 9 degrees of freedom (9-DOF) inertial measurement unit (IMU) 205, a microprocessor (not shown) in communication with pressure sensors 201 and 202, and IMU 205, and a waterproof housing in the form of flexible silicone band 110 to house the microprocessor, pressure sensors 201 and 202, and IMU 205.

System 100 also includes an external computer unit 115, preferably in the form of a smart phone 111, a tablet 112, a smart watch or wearable device (collectively represented by reference 113) or personal computer, in communication with device 101 for receiving and, optionally or additionally, combining input data from both of pressure sensors 201 and 202, and IMU 205, via the microprocessor. It will be appreciated that the combination of input data from both of pressure sensors 201 and 202, and IMU 205, may occur on the microprocessor before being received by the external computer unit 115, or any other external unit. Alternatively, the combination of input data from both of pressure sensors 201 and 202, and IMU 205, may occur on an external unit after being received by the external computer unit 115. The input data is used to infer at least one force magnitude and at least one force direction, the input data being used to provide the performance metric of the motion.

In an alternative embodiment, the system 100 further includes a processing unit (not shown), configured to combine input data from both of pressure sensors 201 and 202, and IMU 205. The processing unit may form at least a part of or be incorporated into the microprocessor (not shown). Alternatively, the processing unit may form at least a part of or be incorporated into the external computer unit 115. In other embodiments, the processing unit may be separate from, but in communication with, the microprocessor and/or the external computer unit.

Wearable Device

Figure 3A:
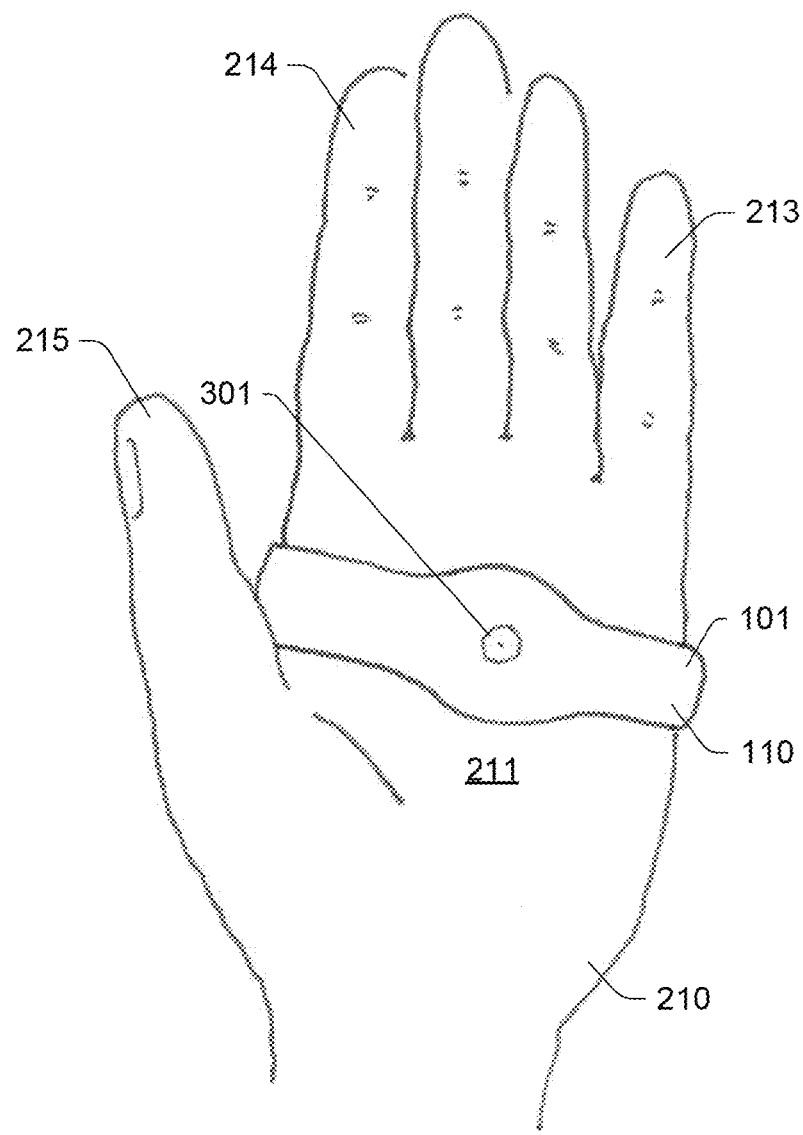
FIG. 3A is a top view representation of an alternate embodiment of a wearable sensor device of the system of FIG. 1 in use.
Figure 3B:
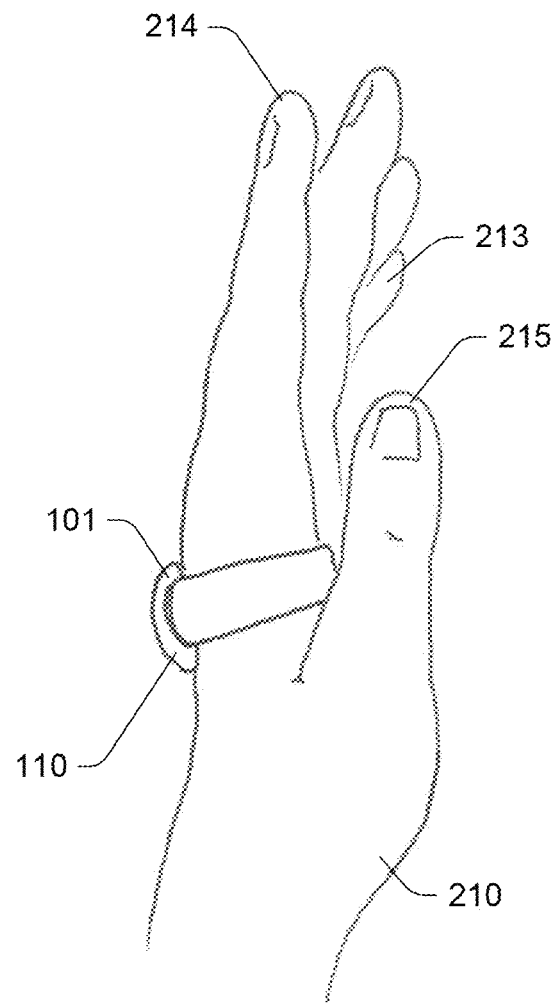
FIG. 3B is a right side view representation of the wearable sensor device of FIG. 3A.
Figure 3C:
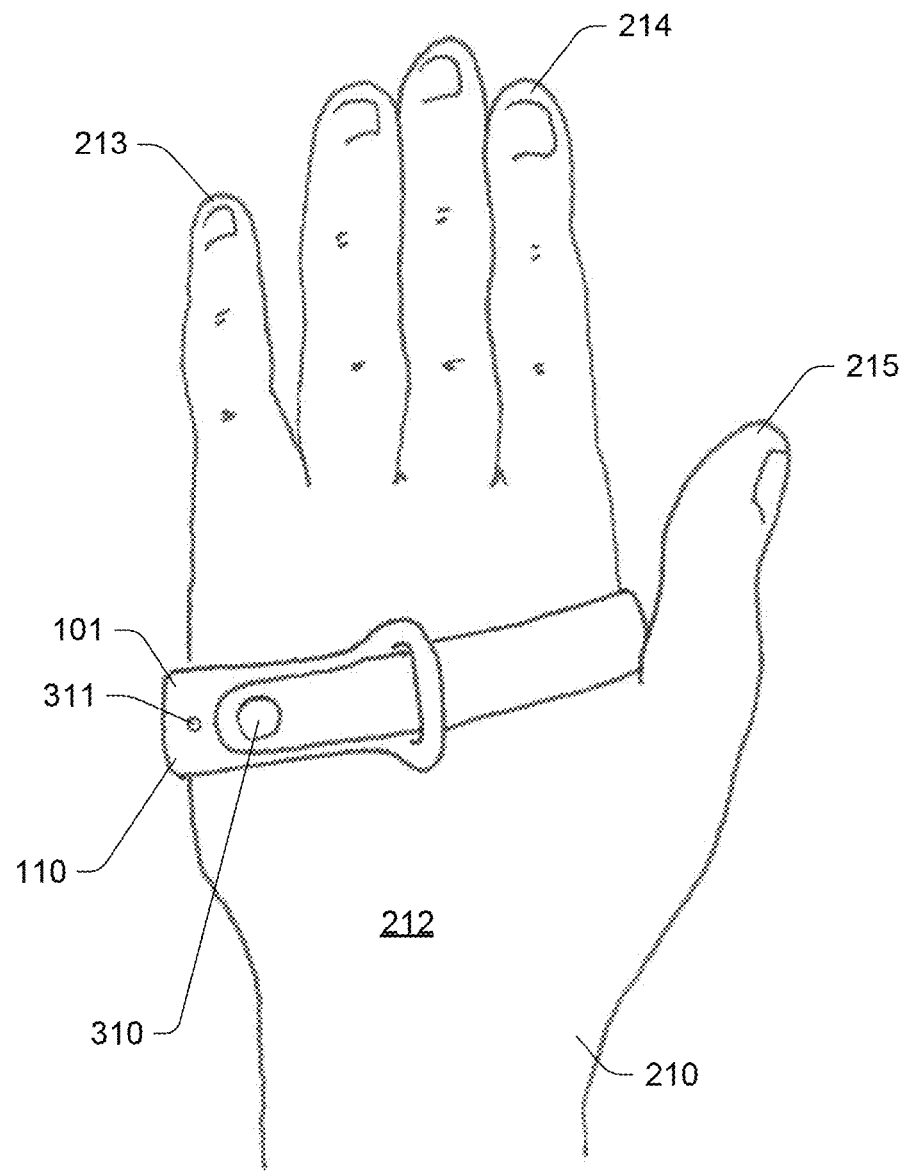
FIG. 3C is a bottom view representation of the wearable sensor device of FIGS. 3A and 3B.
Figure 3D:
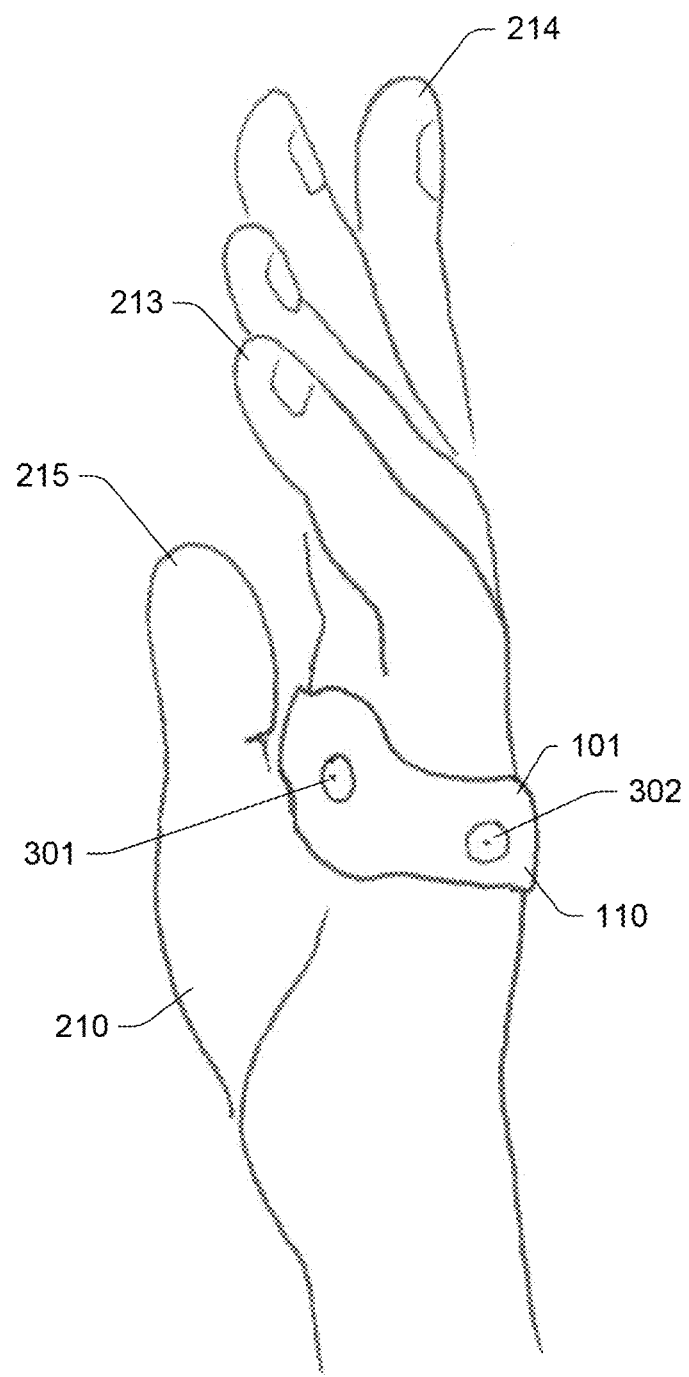
FIG. 3D is a left side view representation of the wearable sensor device of FIGS. 3A to 3C.

Referring specifically to FIGS. 3A to 3E, device 101 is adapted to be worn on a hand 210 of the user snuggly wrapped around the palm 211. The illustrated embodiment is shown as being worn on the left hand 210, but it is equally capable of being worn on the corresponding position of a right hand. Device 101 includes two pressure sensors 301 and 302. As shown in FIG. 3A, pressure sensor 301 is disposed on device 101 such that, in use, pressure sensor 301 is positioned substantially centrally on palm 211. As shown in FIG. 3D, pressure sensor 302 is disposed on device 101 such that, in use, pressure sensor 302 is positioned on the short edge side of left hand 210 adjacent the little finger 213. It will be appreciated that IMU 205 (not shown in FIGS. 3A to 3E) can be disposed on any part of device 101, as it will not affect the measurement of data from IMU 205. It is noted that in this embodiment, band 110 is an adjustable band arrangement that will be described in more detail below.

Figure 2A:
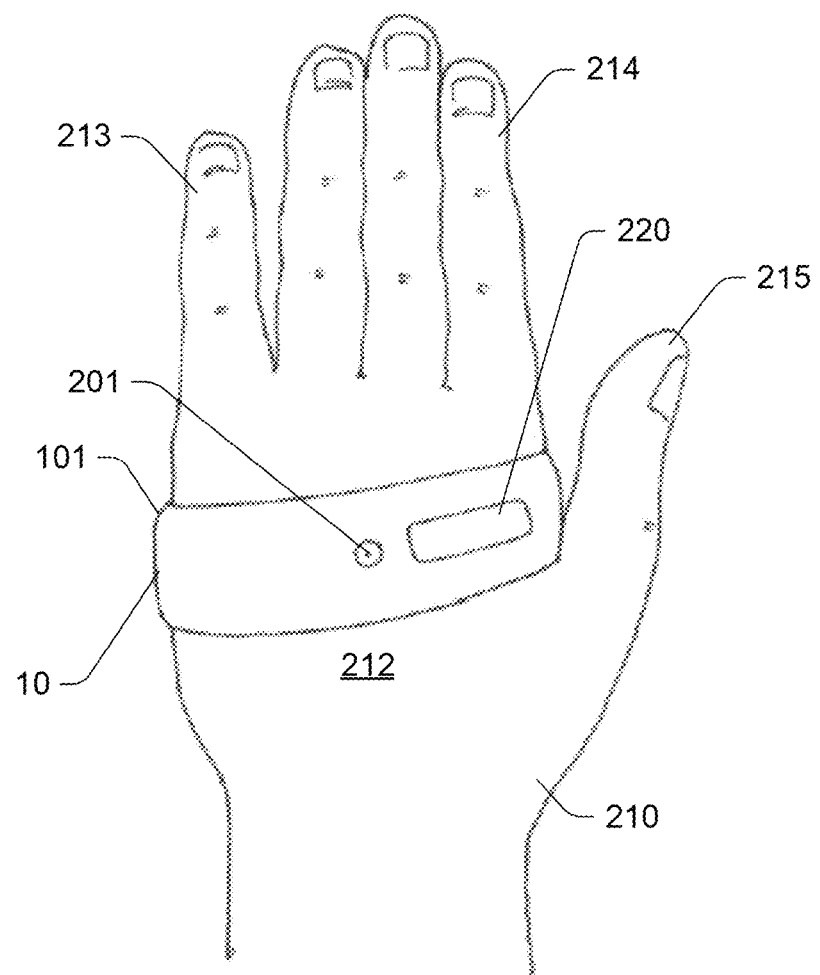
FIG. 2A is a top view representation of a wearable sensor device of the system of FIG. 1 in use.
Figure 2B:
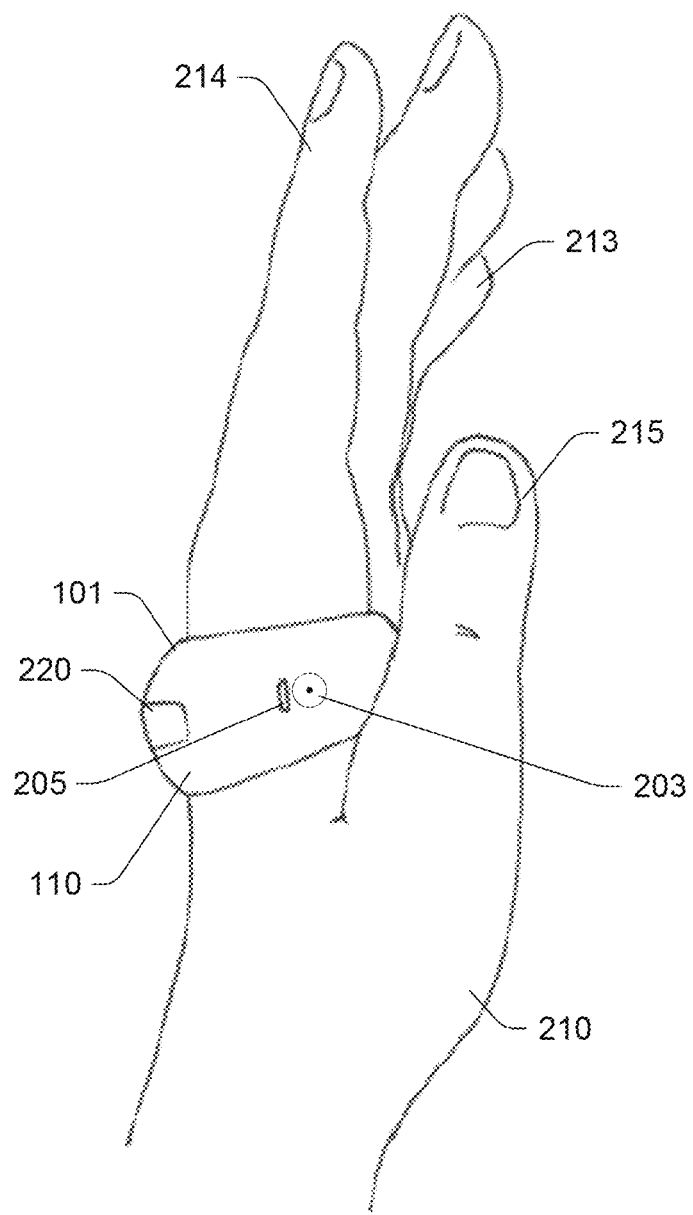
FIG. 2B is a right side view representation of the wearable sensor device of FIG. 2A.
Figure 2C:
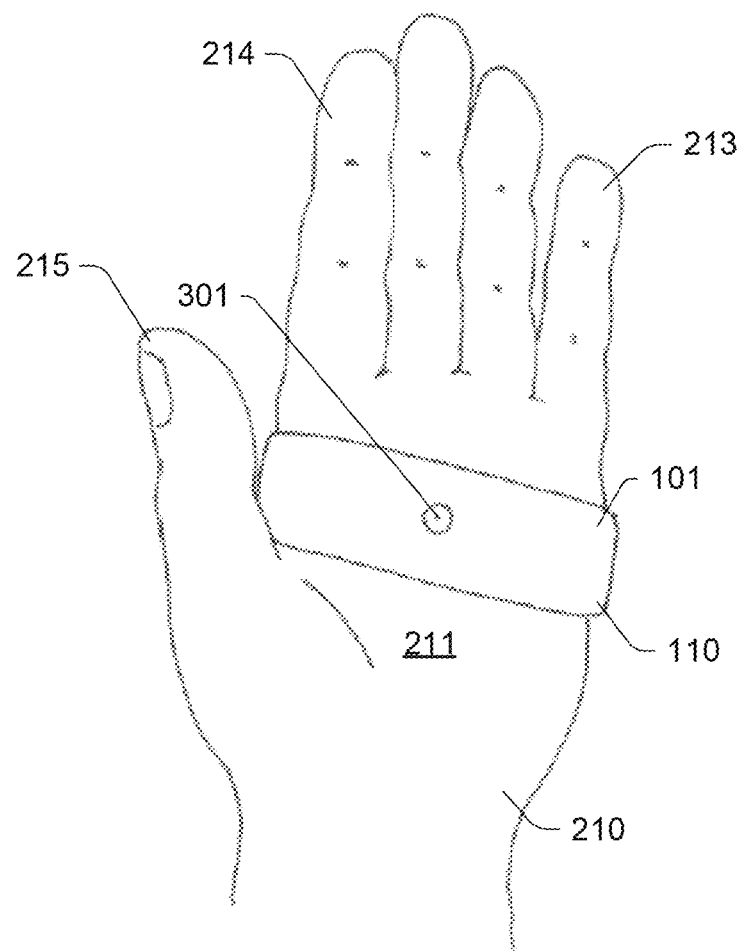
FIG. 2C is a bottom view representation of the wearable sensor device of FIGS. 2A and 2B.
Figure 2D:
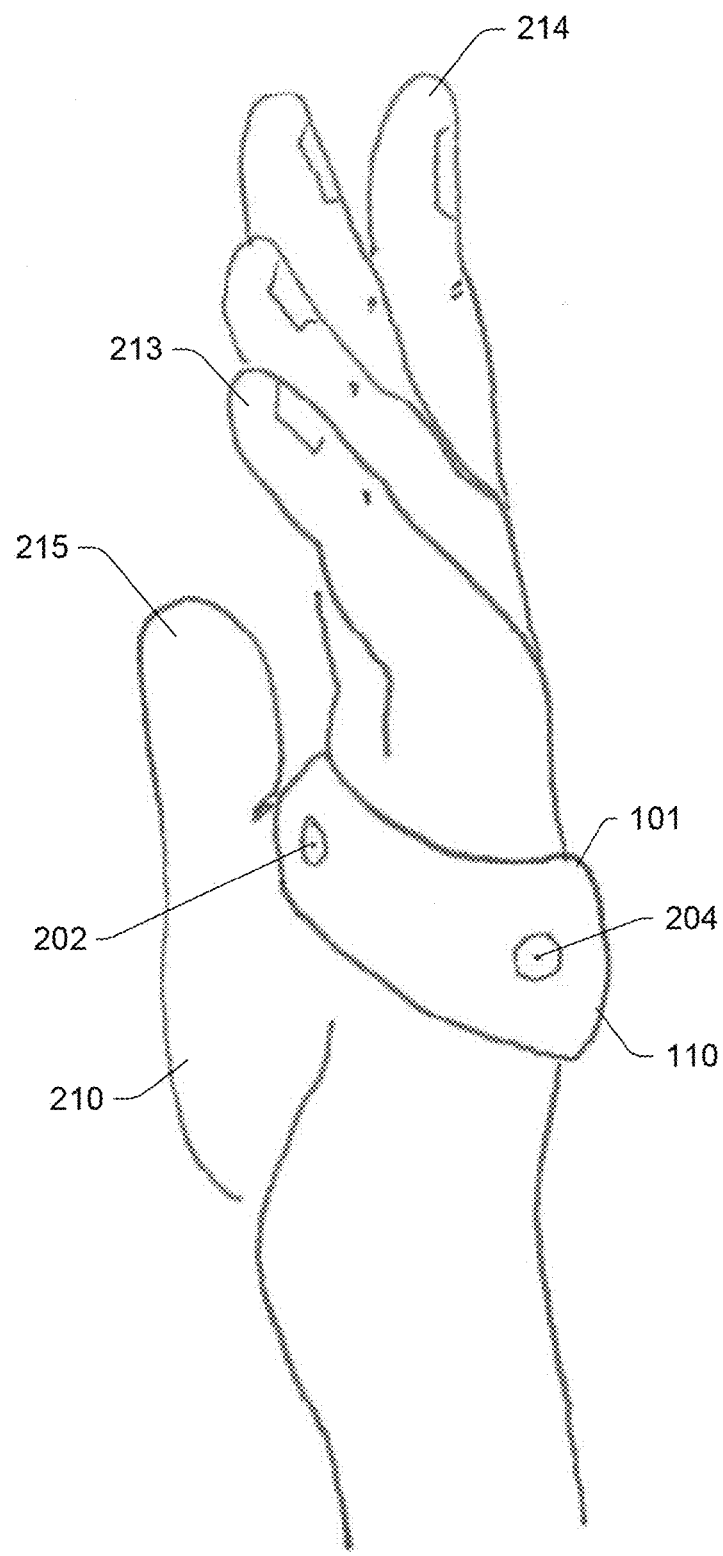
FIG. 2D is a left side view representation of the wearable sensor device of FIGS. 2A to 2C.

It will be appreciated that, in other embodiments, device 101 includes more than two pressure sensors. Referring specifically to FIGS. 2A to 2D, an alternate embodiment of device 101 includes four pressure sensors, denoted by reference numbers 201, 202, 203 and 204. As shown in FIG. 2A pressure sensor 201 is disposed on device 101 such that, in use, pressure sensor 201 is positioned substantially centrally on the dorsal side 212 of left hand 210. As shown in FIG. 2C, pressure sensor 202 is disposed on device 101 such that, in use, pressure sensor 202 is positioned substantially centrally on palm 211. As shown in FIG. 2B, pressure sensor 203 and IMU 205 are disposed substantially adjacent each other on device 101 such that, in use, pressure sensor 203 and IMU 205 is positioned on the short edge side of left hand 210 adjacent the index finger 214 and thumb 215. As shown in FIG. 2D, pressure sensor 204 is disposed on device 101 such that, in use, pressure sensor 204 is positioned on the short edge side of left hand 210 adjacent the little finger 213. As noted above, in other embodiments, IMU 205 is disposed on other parts of device 101, for example in use on the opposite short edge left hand 210 adjacent the little finger 213.

It will be appreciated that, in other embodiments, there is other than two or four pressure sensors. It will be further appreciated that the two pressure sensor configuration of FIGS. 3A to 3E is also applicable to the embodiment of FIGS. 2A to 2D without the adjustable band. In such an embodiment, device 101 would only include pressure sensors 202 and 204. In another embodiment, device 101 includes one pressure sensor that, in use, is positioned substantially centrally on the palm of the user's left hand.

In other embodiments, more than one pressure sensor can be placed, in use, on the palm, dorsal, distal, proximal or either short edge of the hand near the thumb or little finger, with the IMU affixed anywhere on the hand. In other embodiments, a plurality of pressure sensors can be placed, in use, at any location on the hand and fingers including distally (adjacent the fingertips) and proximally (close to the wrist). It will be appreciated that the placement of the pressure sensors is limited only by the shape of the waterproof housing.

In embodiments specific to swimming, two sets of pressure sensors and IMUs are placed on both hands of the swimmer. In yet other embodiment, a plurality of pressure sensors and IMUs are placed on the swimmer's body including one or more of the wrists, other parts of the arms, the shoulders, the feet, the legs, the torso, the back, the hip and the head. In preferred embodiments, the plurality of pressure sensors and IMUs are in wireless communication. In other embodiments, the plurality of pressure sensors and IMUs are hard wired to each other.

It is noted that the use of two or more pressure sensors allows the effect of hydrostatic pressure to be removed as part of calculating the performance metric by taking the differential signal of a sensor pair. These two or more pressure sensors can be arranged such that they are, in use, disposed either symmetrically on opposing sides of the hand or in an alternate fashion, such as on the front and side of the hand. It is appreciated that the preferred four pressure sensor embodiment covers both of these configurations.

The microprocessor takes the form of an ARM microprocessor. Furthermore, device 101 includes on-board non-volatile memory and is powered by a lithium-ion rechargeable battery (including positive voltage regulator). Device 101 also includes Bluetooth capabilities, more preferably Bluetooth Low Energy, in the form of a transceiver for allowing wireless communication between device 101 and external computer unit 115. Device 101 includes ANT+ hardware which is especially useful for communicating with other sensory wearable devices, such as a heart-rate monitor, or another device 101 worn on a different limb. In other embodiments, the components and/or functionality of external computer unit 115 is built into device 101 and housed within the same housing, in this case band 110.

Figure 8:
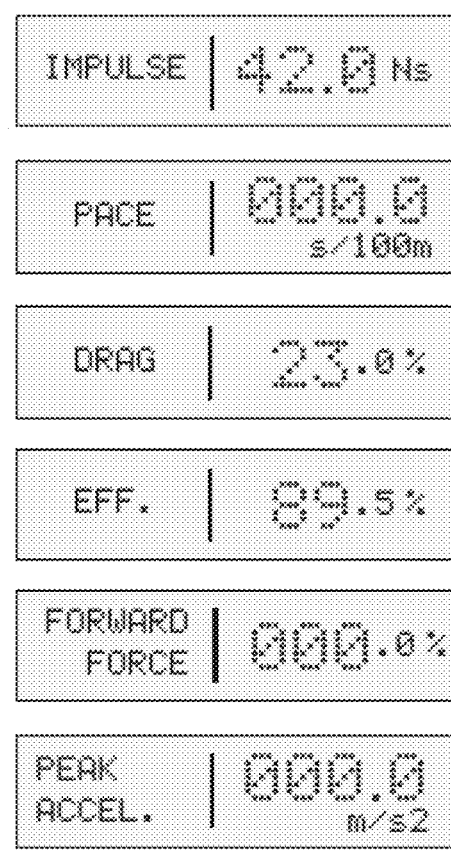
FIG. 8 is a view of multiple examples of versions of the display of the wearable sensor device of FIG. 1.

As best shown in the embodiment of FIG. 2A, device 101 includes an organic light-emitting diode (OLED) display 220. In other embodiments, the display is other than an OLED display, for example, a liquid crystal display (LCD). Furthermore, it will be appreciated that in other embodiments similar to those of FIGS. 3A to 3E, there is included a display. Display 220 provides general device information, such as battery power, as well as providing efficiency feedback to the user. The user is able to selectively set which metrics to be shown on display 220 and therefore be viewed during an activity such as swimming. Referring to FIG. 8, there is illustrated several examples of metrics shown by display 220, including: Impulse (shown in this example as "42.0 Ns"); Pace (shown in this example as "000.0 s/100 m"), Drag (shown in this example as "23.0%"), Efficiency (shown in this example as "89.5%"); Forward Force (shown in this example as "000.0%") and Peak Acceleration (shown in this example as "000.0 m/s$^2$").

In other embodiments, different performance metrics are available, including but not limited to:
Force on the body part (in Newtons).
Efficiency (as a percentage).
Force in each global axis (in Newtons). In embodiments, the global axes relate to the forward direction of motion, that is, a desired direction of movement as a result of the motion of the user. In other embodiments, the global axes relate to a part of the swimmer's body.
Power generated (in Watts).
Work done (in Joules)
Impulse in each global axis (in Newton seconds).
Any of the disclosed metrics in each part of the stroke, including entry, pull, push, exit, recovery.
Stoke Length (in Metres or Feet).
Stroke Rate (in strokes per minute).
Lap time (in seconds or milliseconds).
Split time (in seconds or milliseconds).
Number of laps.
Strokes per lap.
Stroke type (will be either freestyle, breaststroke, butterfly, or backstroke).
Velocity or pace (in metres per second or seconds per 100 metres or imperial equivalent).
Hand/body acceleration (in metres per second$^2$).
Stroke path (shown as a 3D plot).
Hand angle throughout stroke (shown as a figure/plot).
Mean/Median/Peak Force Angle (in degrees).

In another embodiment, the performance metric may be inverse impulse seconds which is derived from taking the inverse of a time interval multiplied with the total impulse in all global axes. The time interval may be a lap time or any other appropriate time interval. In some embodiments of the inverse impulse seconds performance metric, normalisation and scaling may be applied to the inverse of the lap times multiplied with the total impulse in all global axes. The inverse impulse seconds performance metric outputs a value which is reflective of a performance over a predetermined time period. Furthermore, an optimum value may be awarded when both lap time and total impulse (that is, the integration of the force) along a lap are low.

For example, in the context of a water sport such as swimming, a short lap time indicates swimming quickly, and low impulse with a low lap time means swimming efficiently. In the case that impulse is high and lap times are low, then a swimming motion may be determined to be inefficient. Further, in the case where the impulse is low and lap times are high, then the swimming motion may be determined to be efficient, but the user may not be putting in enough power. In the case where both lap time and impulse are high, then it may be determined that a lot of effort is being put into the swimming motion by a swimmer, but the user is not getting anywhere.

The inverse impulse seconds performance metric, or any of its variations, may be referred to or abbreviated as 'iimps', although it will be appreciated that any other name can be used.

Furthermore, it will be appreciated that in different embodiments, the above metrics may be provided utilising alternative units of measurement.

Furthermore, it will be appreciated that in different embodiments, the above metrics will be viewable on display 220 or on external computer unit 115. In other embodiments, the metrics that require a more complex representation, over and above a numeral (such as those that require a figure or plot) will only be viewable on external computer unit 115. However, alternate embodiments of display 220 are capable of displaying the more complex representation.

Figure 14:
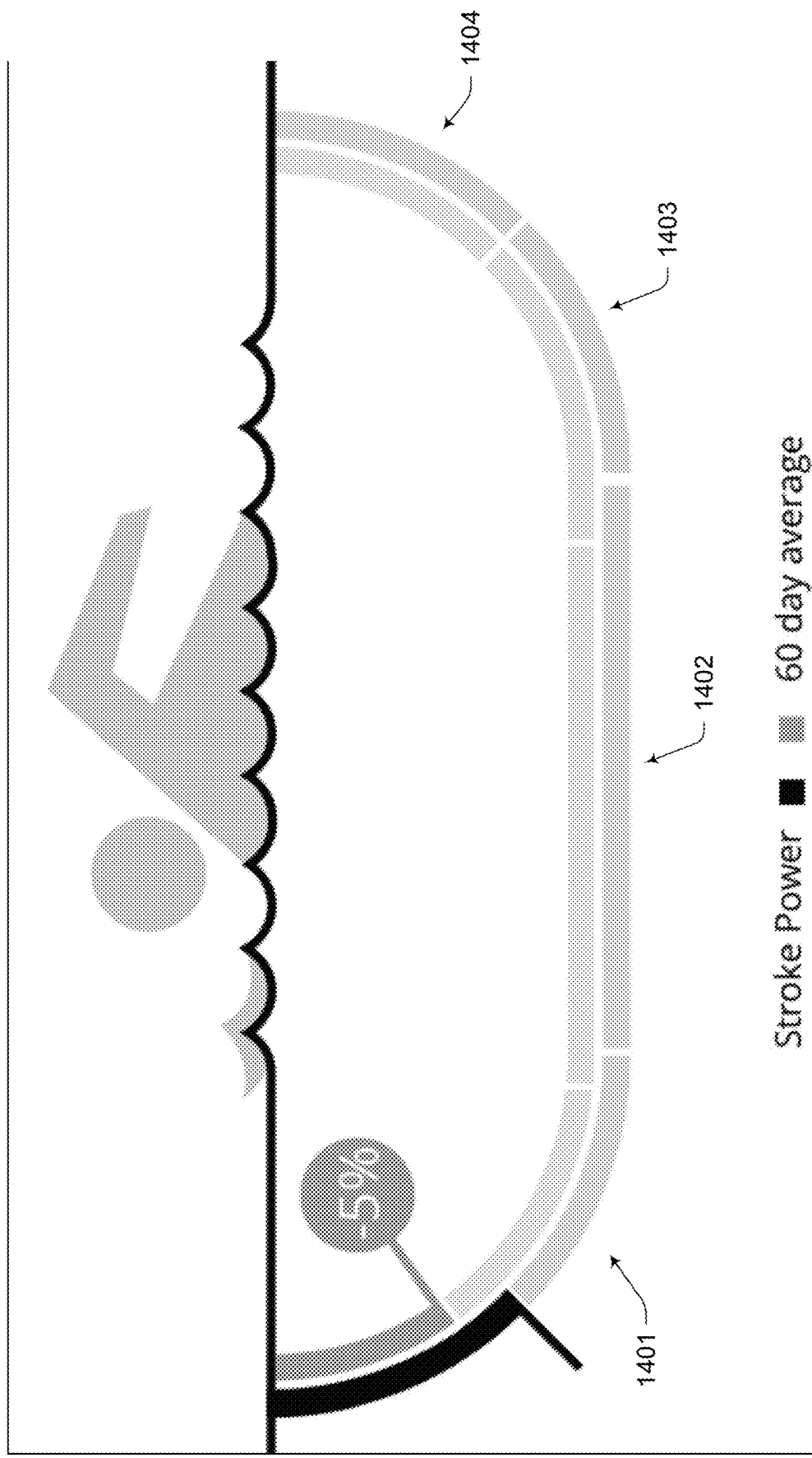
FIG. 14 is a view of an embodiment of an output display of a user interface of the system of FIG. 1.

Referring to FIGS. 14 to 18, a number of more complex representations are provided to show a force profile, specifically:

FIG. 14 illustrates an example of a graphical force profile showing performance metric (in this case Power), segmenting the stroke into four phases (entry 1401, pull 1402, push 1403, exit 1404), and showing a current power reading of the entry and comparing it to the swimmer's 60-day average.

Figure 15:
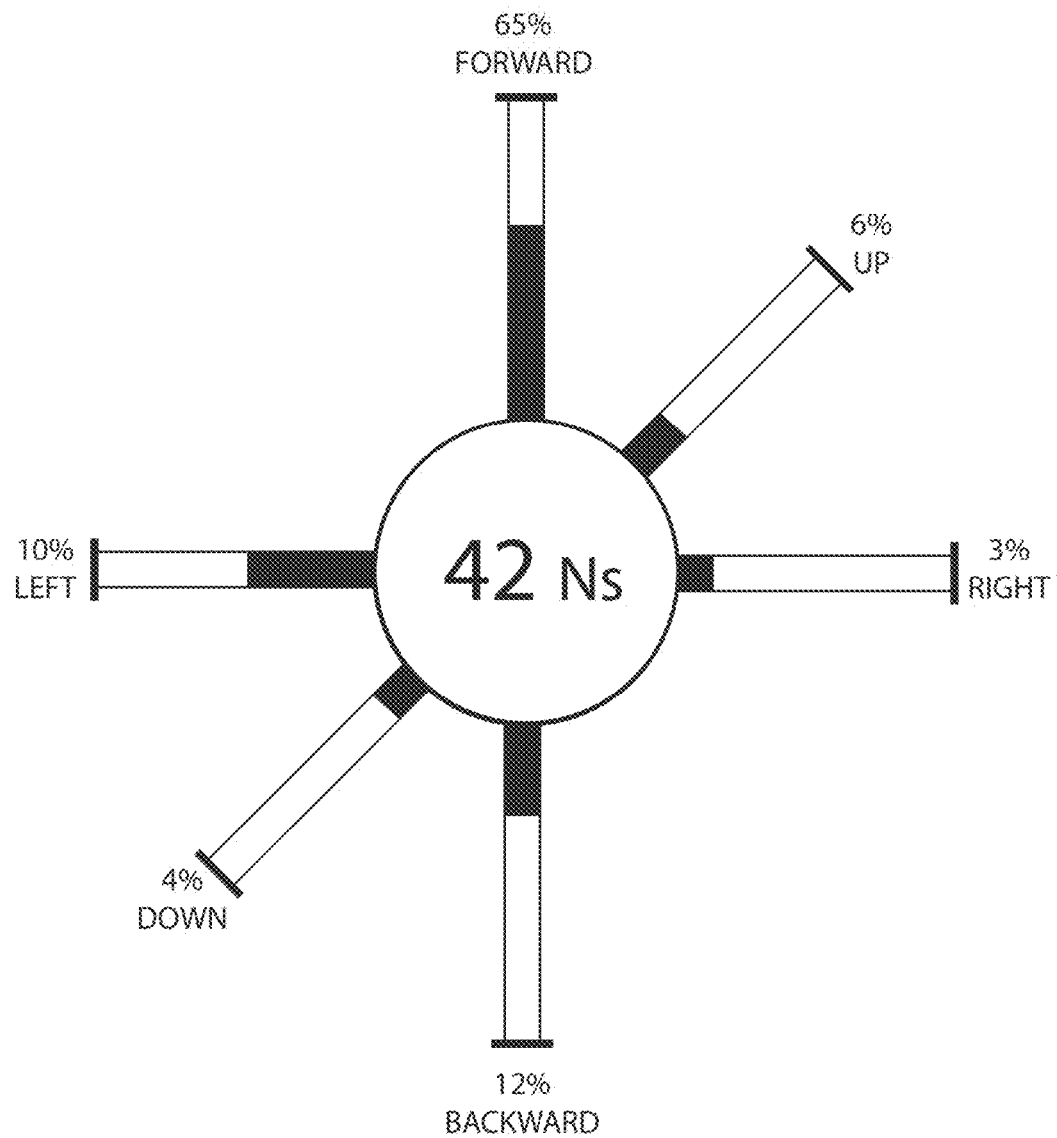
FIG. 15 is a view of an embodiment of an output display of a user interface of the system of FIG. 1.

FIG. 15 illustrates an example of a graphical force profile showing a summary of one of a stroke, lap, session or any period of time. This graphical representation shows magnitude of force profile decomposed into 3 axes. The number represents the impulse of the stroke or an average of multiple.

Figure 16:
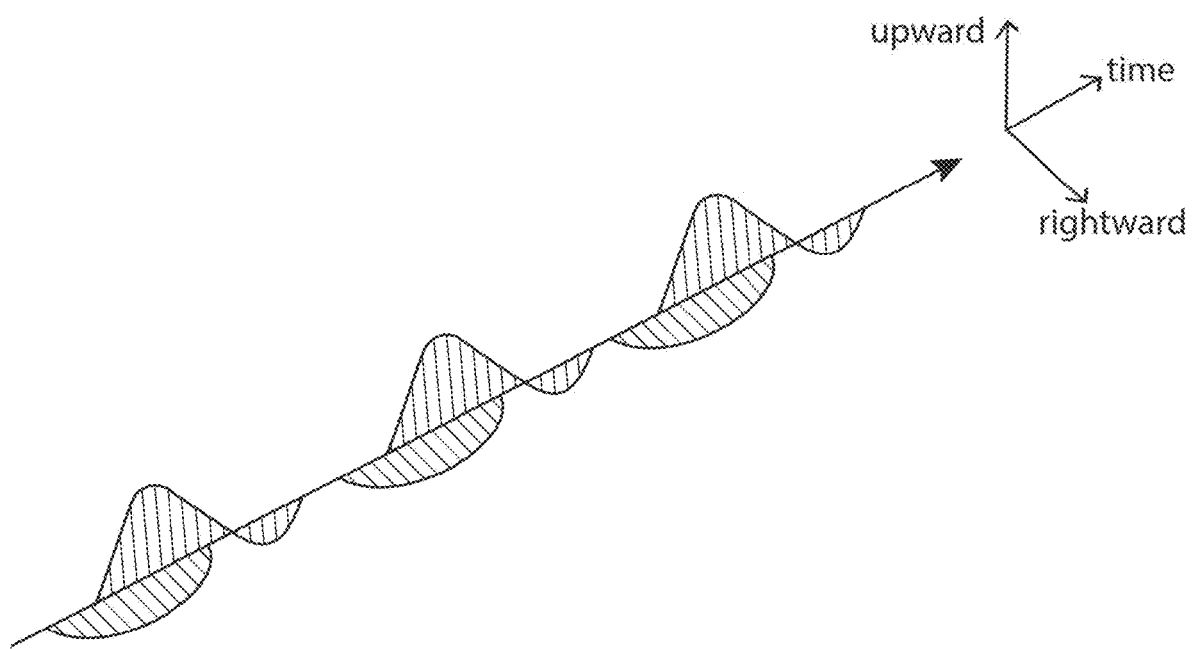
FIG. 16 is a view of an embodiment of an output display of a user interface of the system of FIG. 1.

FIG. 16 illustrates an example of a graphical force profile showing a force 'leak' of three strokes over a period of time. The force 'leak' is the force applied in the upwards and rightwards axes.

Figure 17A:
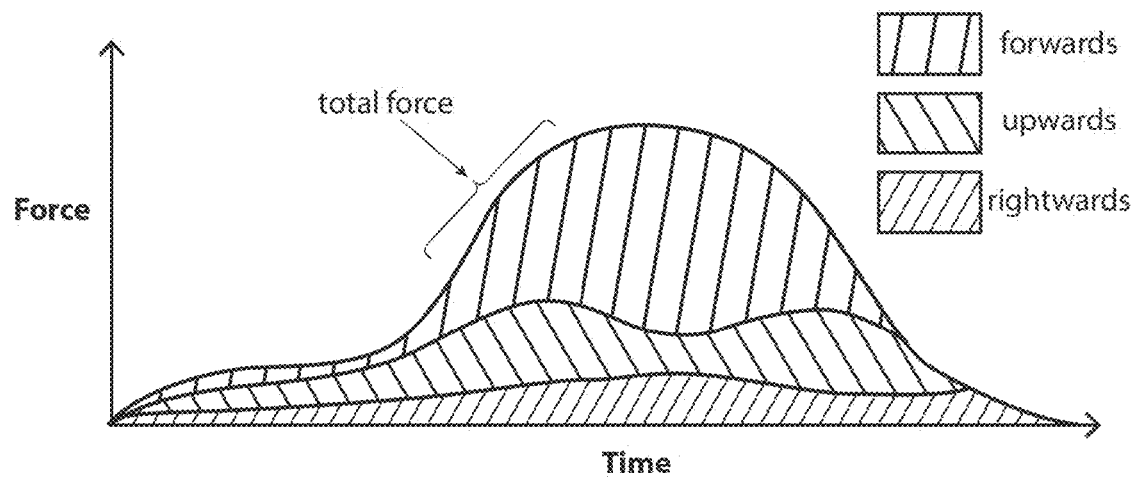
FIGS. 17A and 17B are representations of force profiles shown on an output display of a user interface of the system of FIG. 1.
Figure 17B:
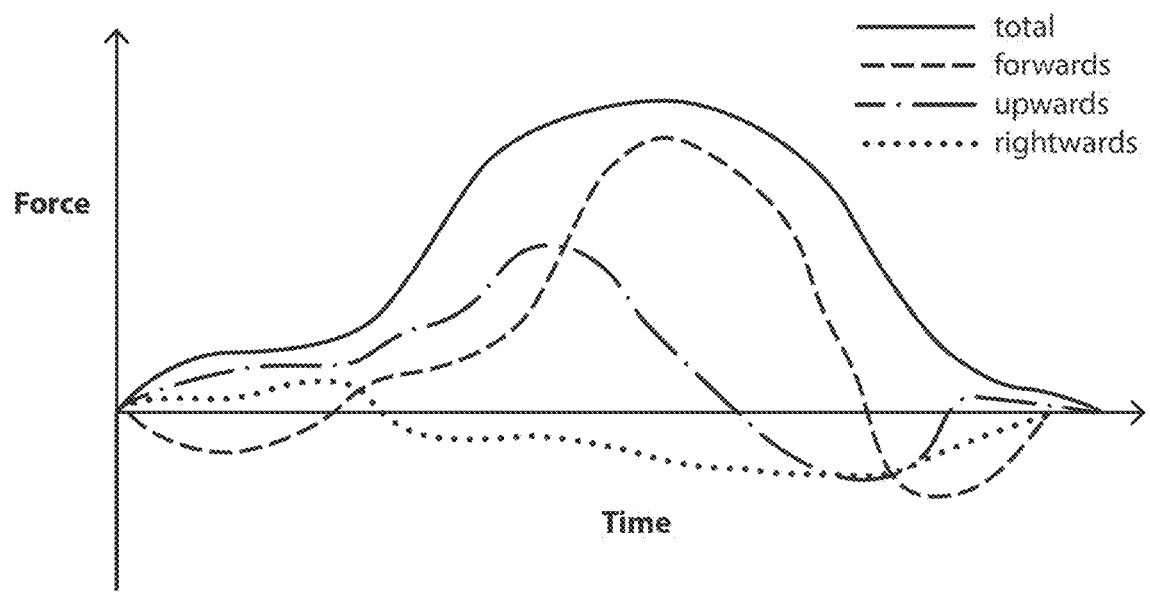

FIGS. 17A and 17B respectively illustrate: an example of a graphical force profile for single stroke shown as cumulative line graph for each direction; and an example of a graphical force profile for single stroke shown as line graphs plotted on the same axis for each direction. Both figures are able to show more than one stroke and are used as application paradigms for displaying whole periods of time.

Figure 18:
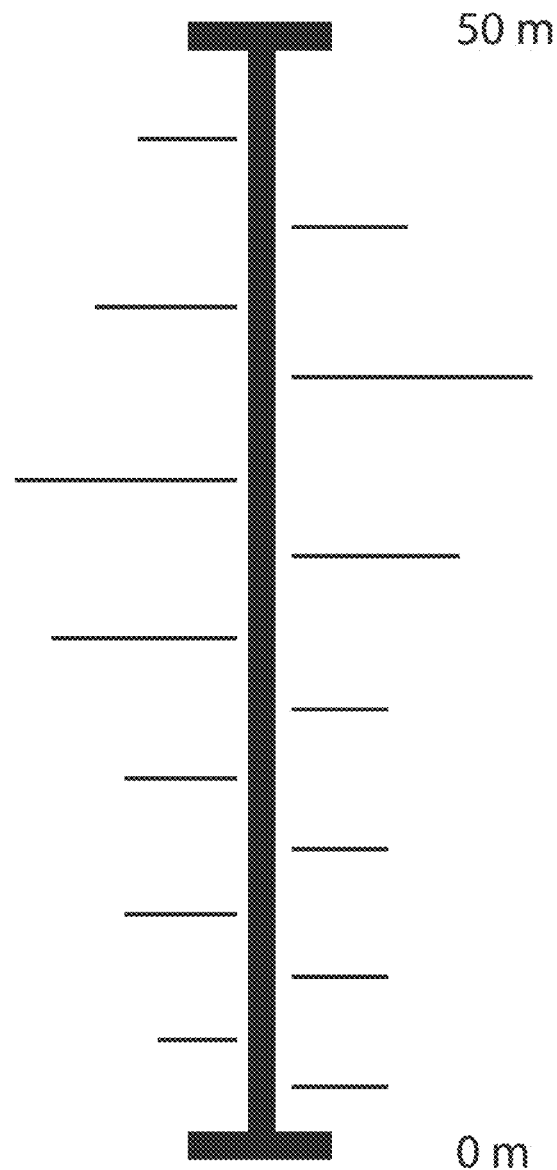
FIG. 18 is a view of an embodiment of an output display of a user interface of the system of FIG. 1.

FIG. 18 illustrates an example of a graphical representation of an impulse stroke plotted on a lap distance. Other metrics are able to be plotted in a similar fashion, including peak force, distance per stroke, and time per stroke, amongst others.

In a further embodiment, the metrics and/or data may be displayed in synchronisation with visual media, such as captured images or video. Synchronisation may be controlled by utilising and/or aligning time stamps on the relevant data. However, it will be appreciated that any appropriate means of synchronisation may be used. The synchronised data may be displayed on the same display or on separate displays. The data and visual media may be displayed in synchronisation side by side. In alternate embodiments, the synchronised data may be displayed by overlaying the video with the data.

The calculation and production of such force profiles will be explained in detail below.

Finally, in embodiments other, device 101 includes a general-use button. In other embodiments, there is included more than one general-use button. In embodiments, the button is integrally formed with band 110. The user can toggle between each of the metrics using the general-use button.

IMU 205 includes an accelerometer, a gyroscope, and a magnetometer. In other embodiments, IMU includes any one of an accelerometer, a gyroscope, and a magnetometer, or a combination of two of any of an accelerometer, a gyroscope, and a magnetometer.

In further embodiments, device 101 includes a plurality of IMUs. In different embodiments, each of the IMUs is either identical or different from one another, or a combination of identical and different IMUs.

Band 110 is a fully waterproof, flexible silicone construction designed for comfort when in use. In different embodiments, band 110 will be different sizes depending on the swimmer and include means for adjustability to ensure a secure fit. For example, band 110 will be produced in a number of predefined sizes (labeled as "small", "medium" and "large" sizes) so that the different sized bands would fit the vast majority of the population.

As shown in FIGS. 2A to 2D, band 110 is worn around the palm of the hand, not around the fingers of the hand, and is strapped on in a snug ring-like manner. Such engagement with the hand is preferable for swimming as it leaves the leave fingers unobstructed and allows the swimmer to get a better 'feel for the water'. Also, the natural finger spread will vary from swimmer to swimmer which can be constrained with finger mounted devices. Furthermore, the palm is a superior sensing location than the fingers as a much larger amount of pressure is exerted given the relatively large surface area.

Flexible silicon construction for conformability to ensure a comfortable and snug fit around the hand. The combination of flexible material and different band sizes meets the need of device 101 to fit snuggly around the palm so as the device will not fall off during use.

Figure 3E:
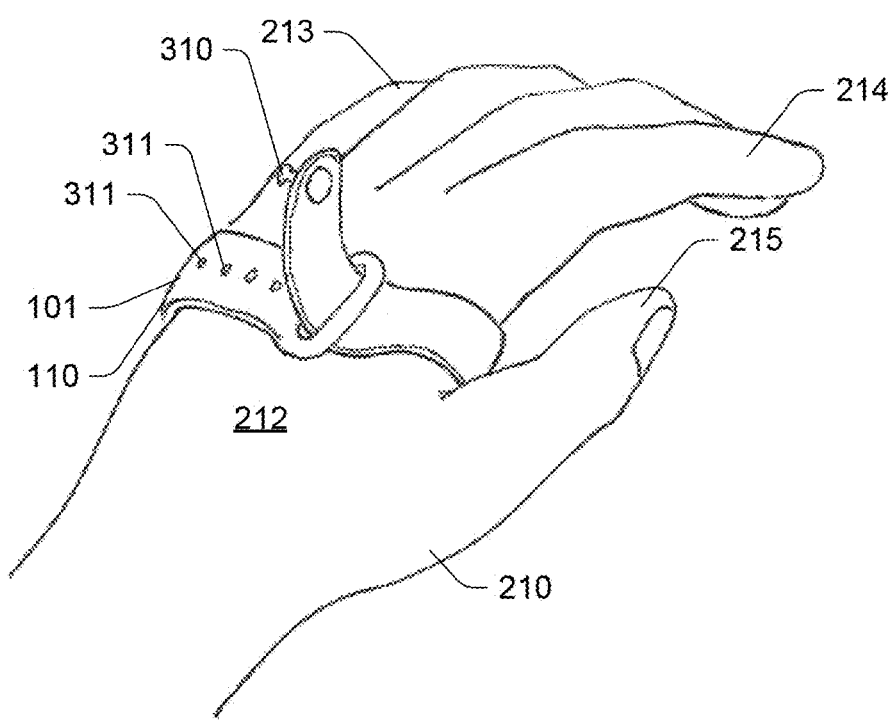
FIG. 3E is a top right orthogonal view representation of the wearable sensor device of FIGS. 3A to 3D, showing an adjustable band out of engagement.

Referring to FIGS. 3A to 3E, in this embodiment, band 110 is a "one-size-fits-all" band with adjustability. As best shown in FIG. 3E, the band is adjustable by way of a pin 310 on one end of band 110 that engages with one of a plurality of apertures 311 such that an interference fit exists between pin 310 and one of apertures 311 to set band 110 to a certain desired size.

Figure 4A:
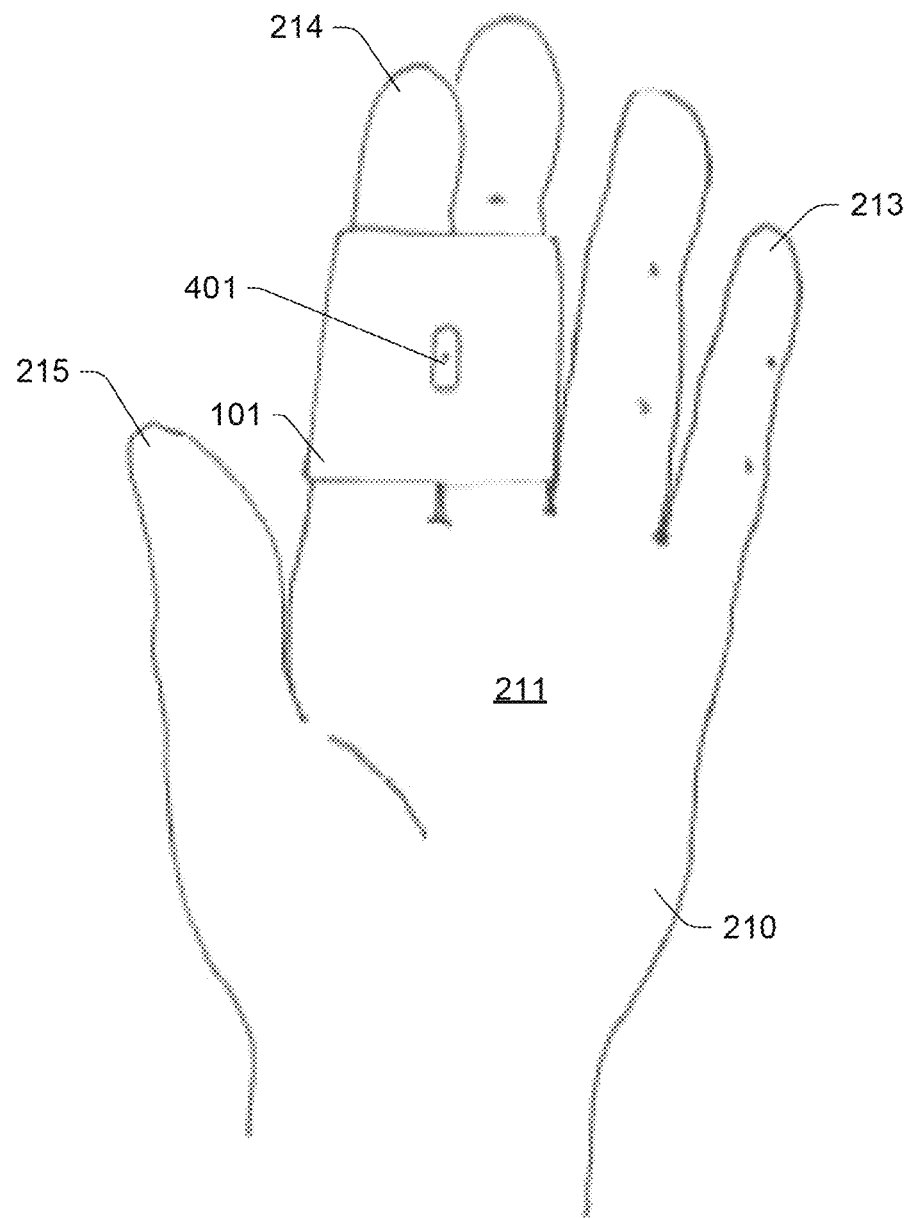
FIG. 4A is a bottom view representation of an alternate embodiment of a wearable sensor device of the system of FIG. 1 in use.
Figure 4B:
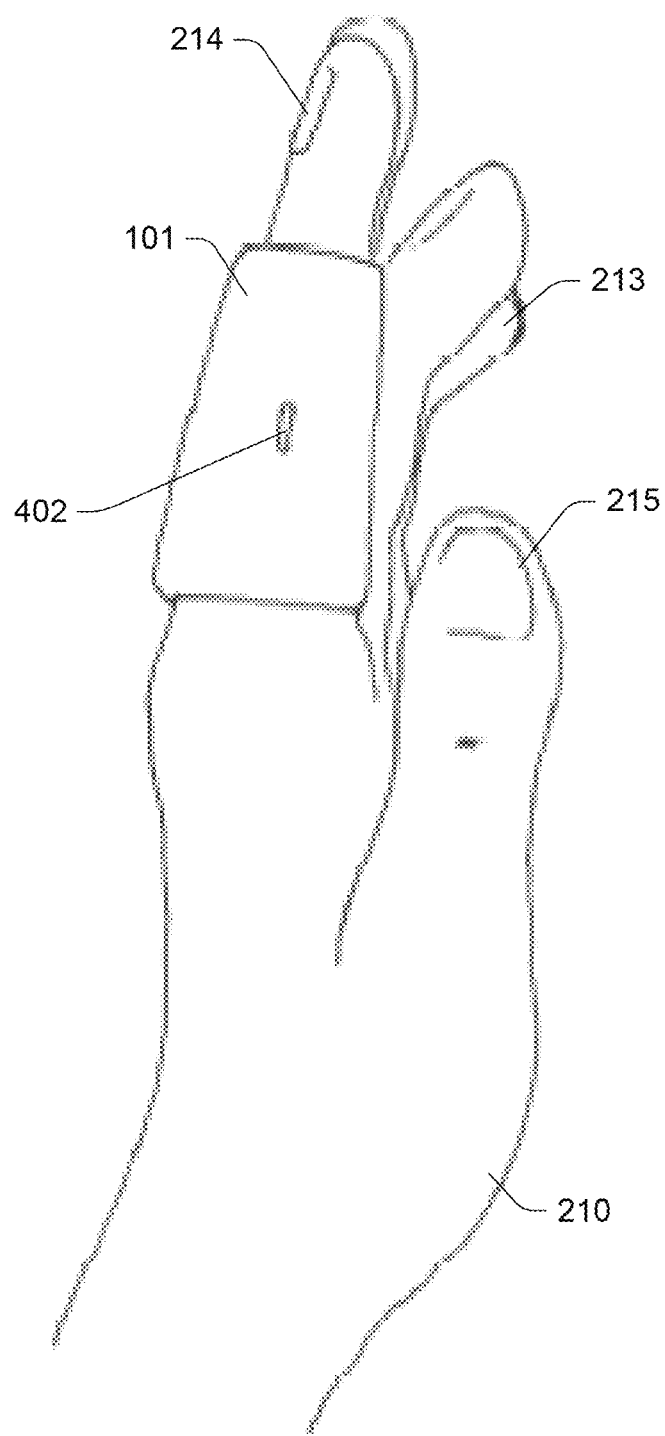
FIG. 4B is a right side view representation of the wearable sensor device of FIG. 4A.
Figure 4C:
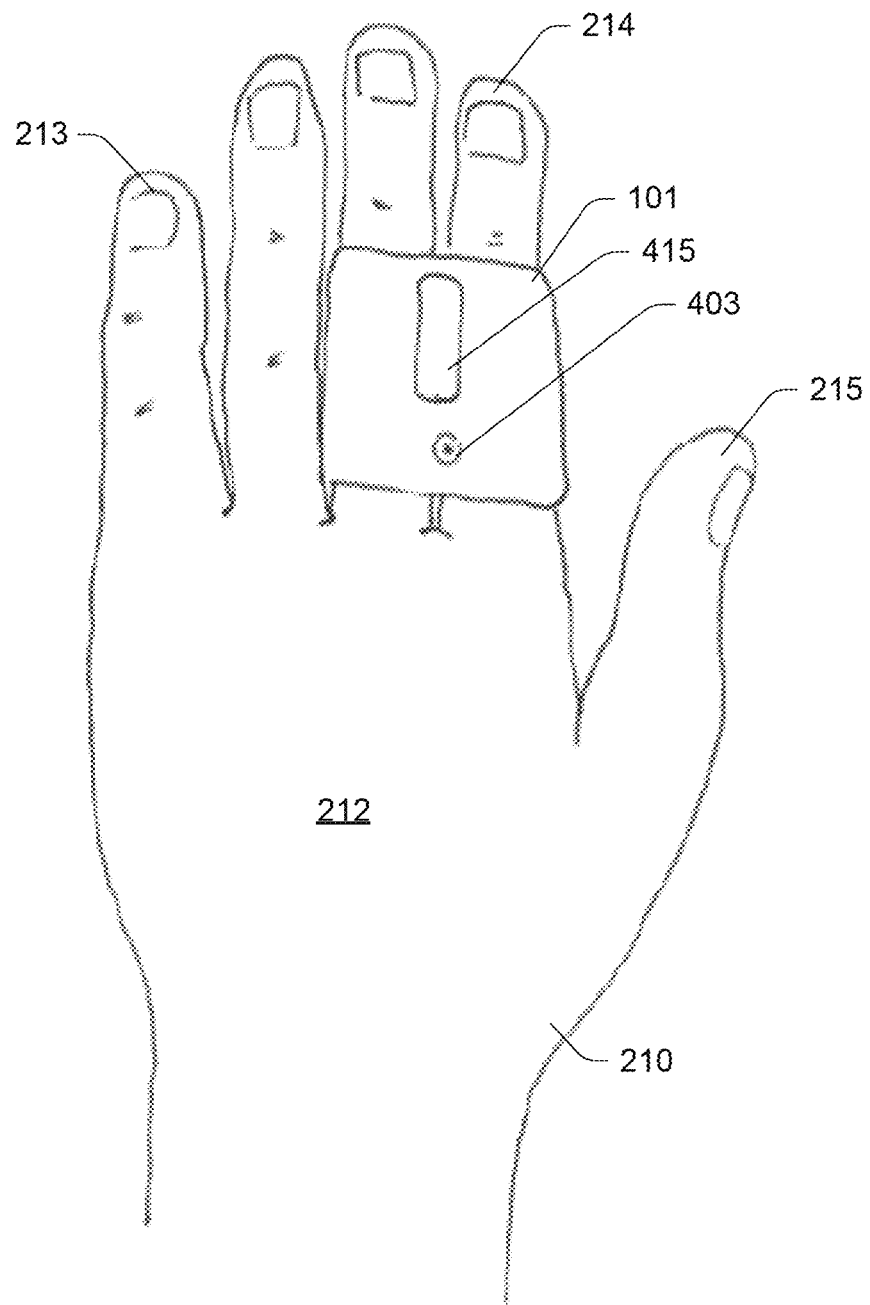
FIG. 4C is a top view representation of the wearable sensor device of FIGS. 4A and 4B.

Other embodiments of device 101 that are design primarily for swimming are illustrated as follows:

FIGS. 4A to 4C show device 101 as ring-worn device with three pressure sensors 401, 402 and 403, a display 420 and an IMU (not shown), as with all the embodiments, this embodiment adapted to be worn on the index and middle fingers of the swimmer's left hand.

Figure 5A:
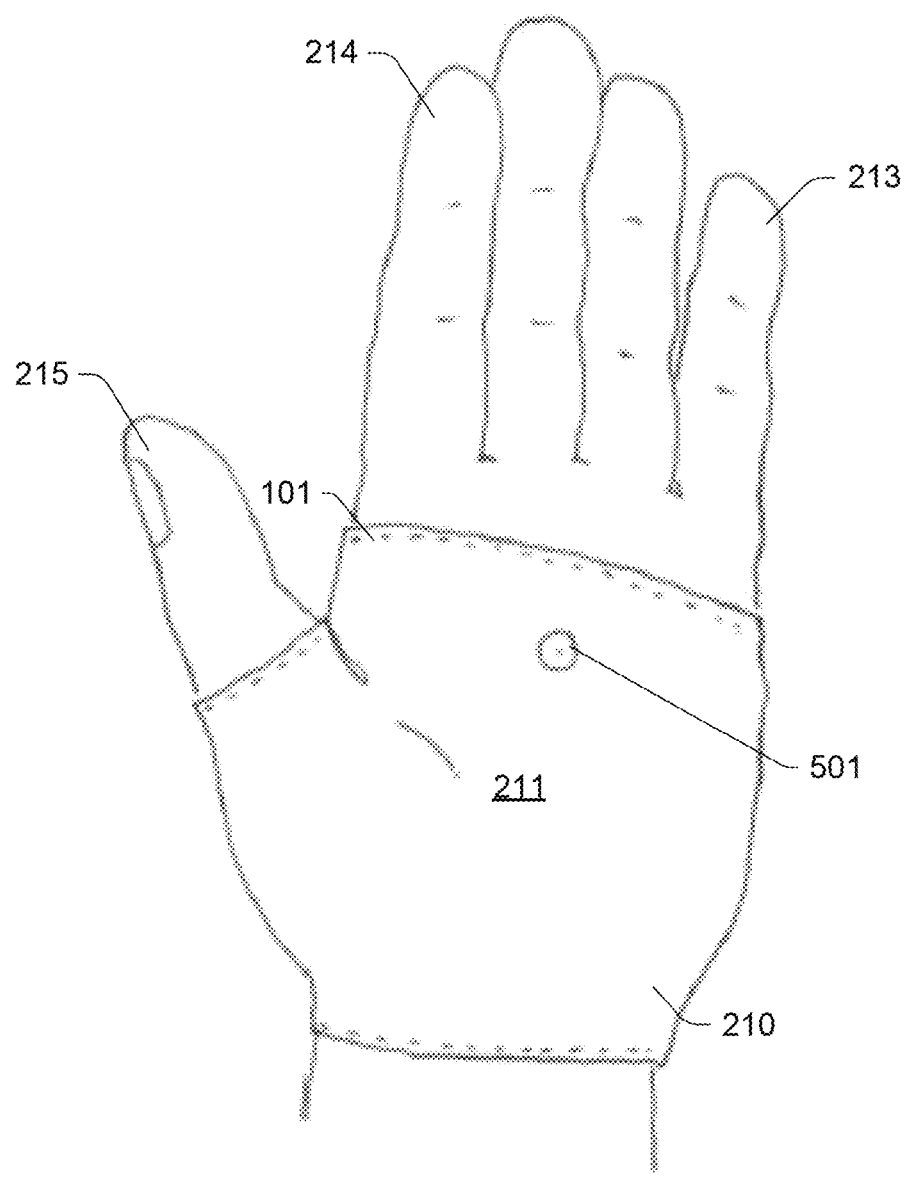
FIG. 5A is a bottom view representation of an alternate embodiment of a wearable sensor device of the system of FIG. 1 in use.
Figure 5B:
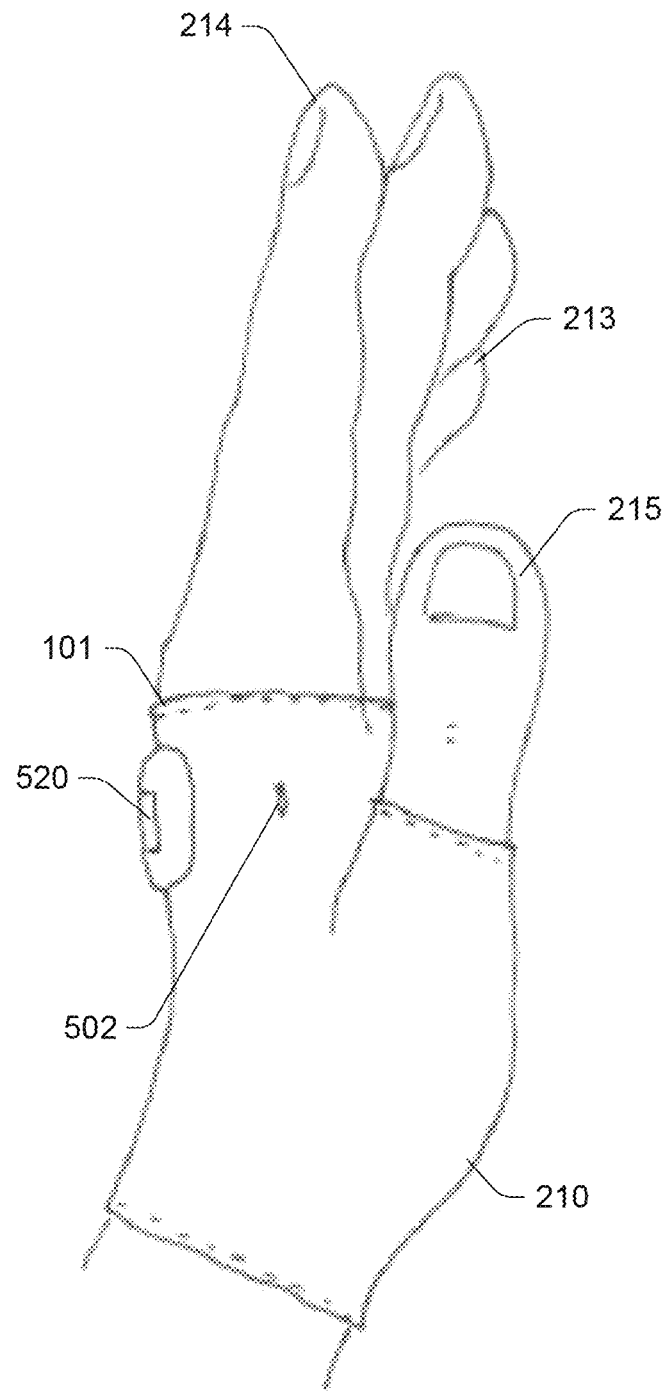
FIG. 5B is a right side view representation of the wearable sensor device of FIG. 5A.
Figure 5C:
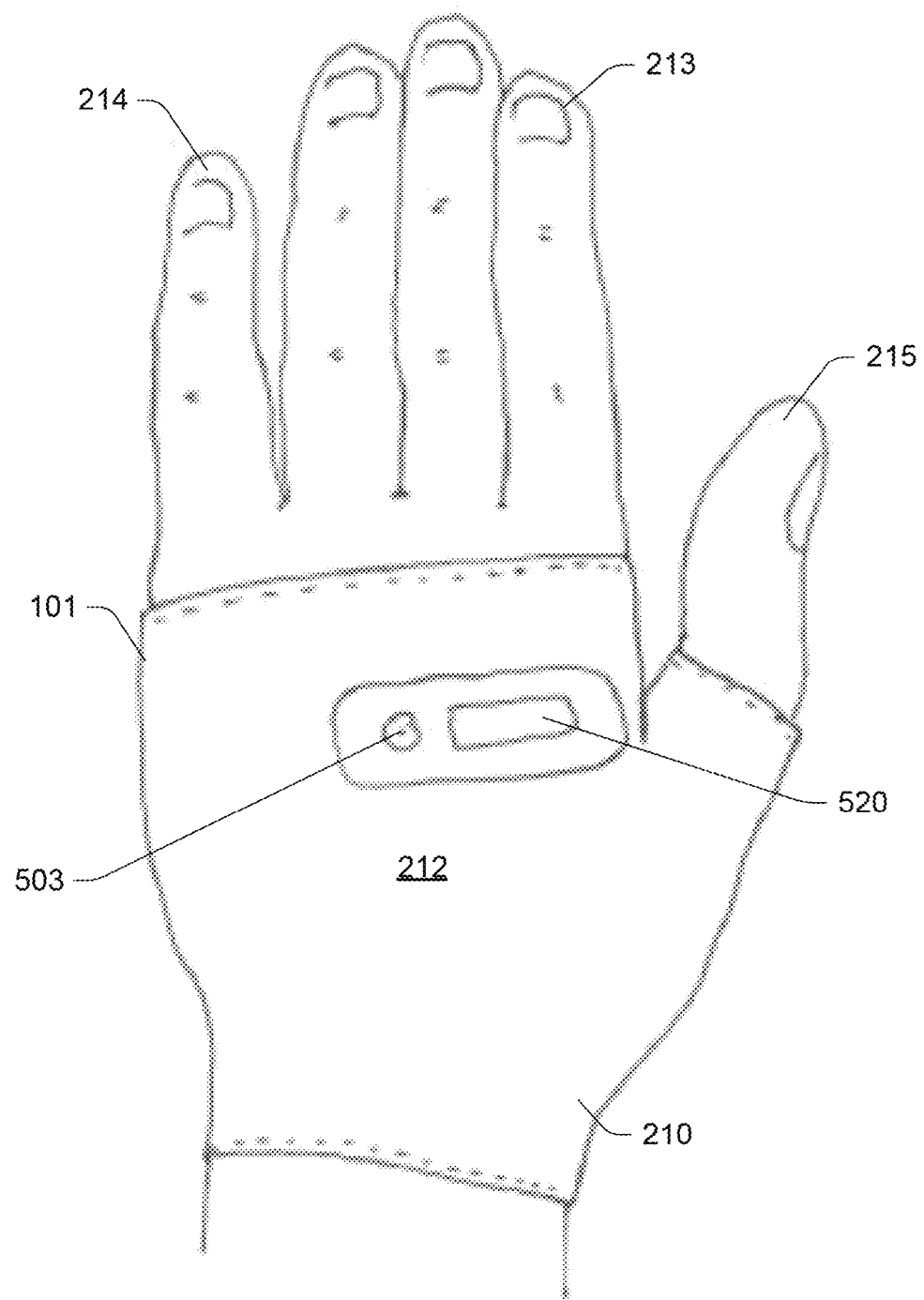
FIG. 5C is a top view representation of the wearable sensor device of FIGS. 5A and 5B.

FIGS. 5A to 5C show device 101 as a glove-like device with three pressure sensors 501, 502 and 503, a display 520 and an IMU (not shown), this embodiment adapted to be worn on the swimmer's left hand and having three openings for respectively allowing uninhibited extension of the thumb, wrist and fingers.

Figure 6A:
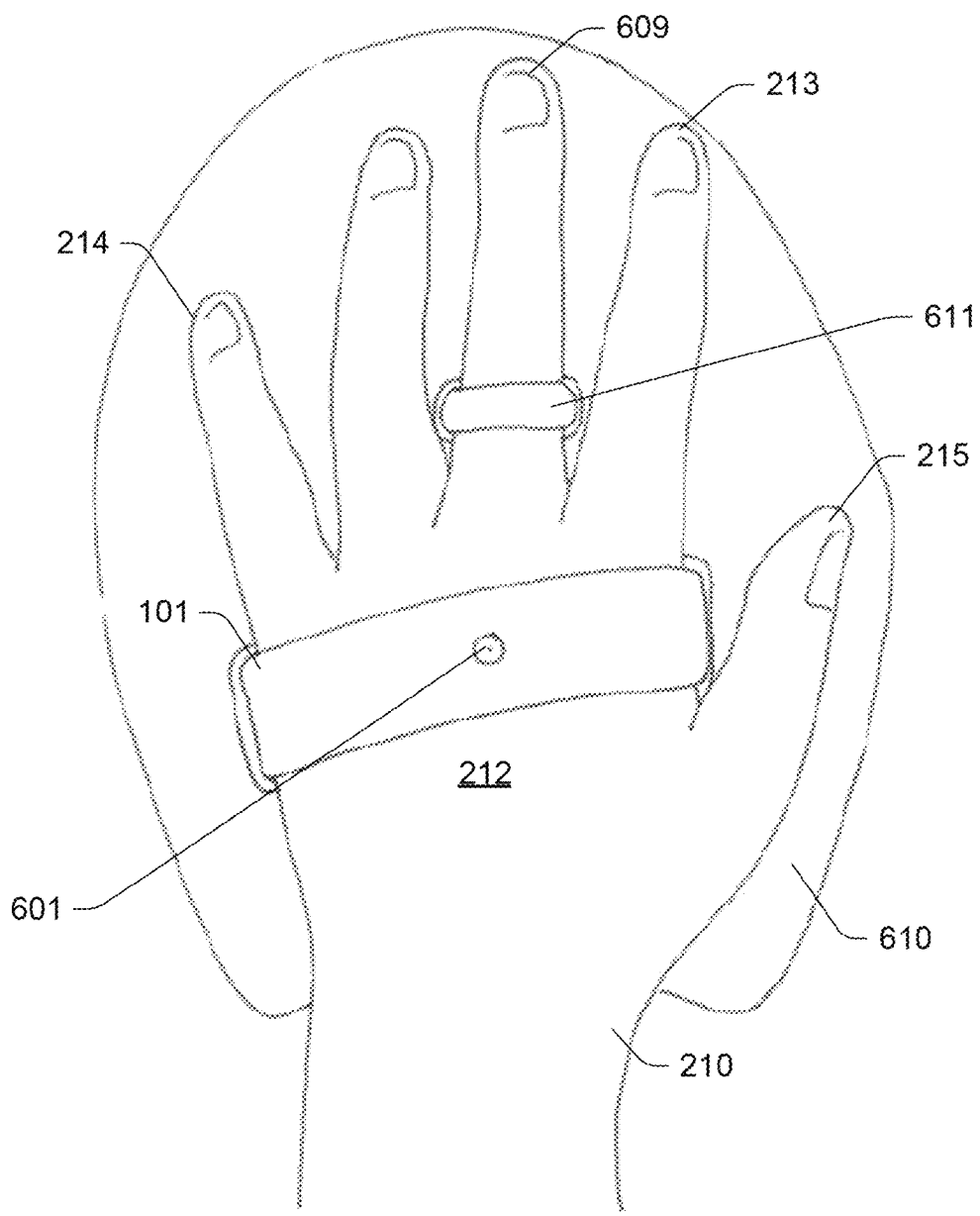
FIG. 6A is a top view representation of an alternate embodiment of a wearable sensor device of the system of FIG. 1 in use.
Figure 6B:
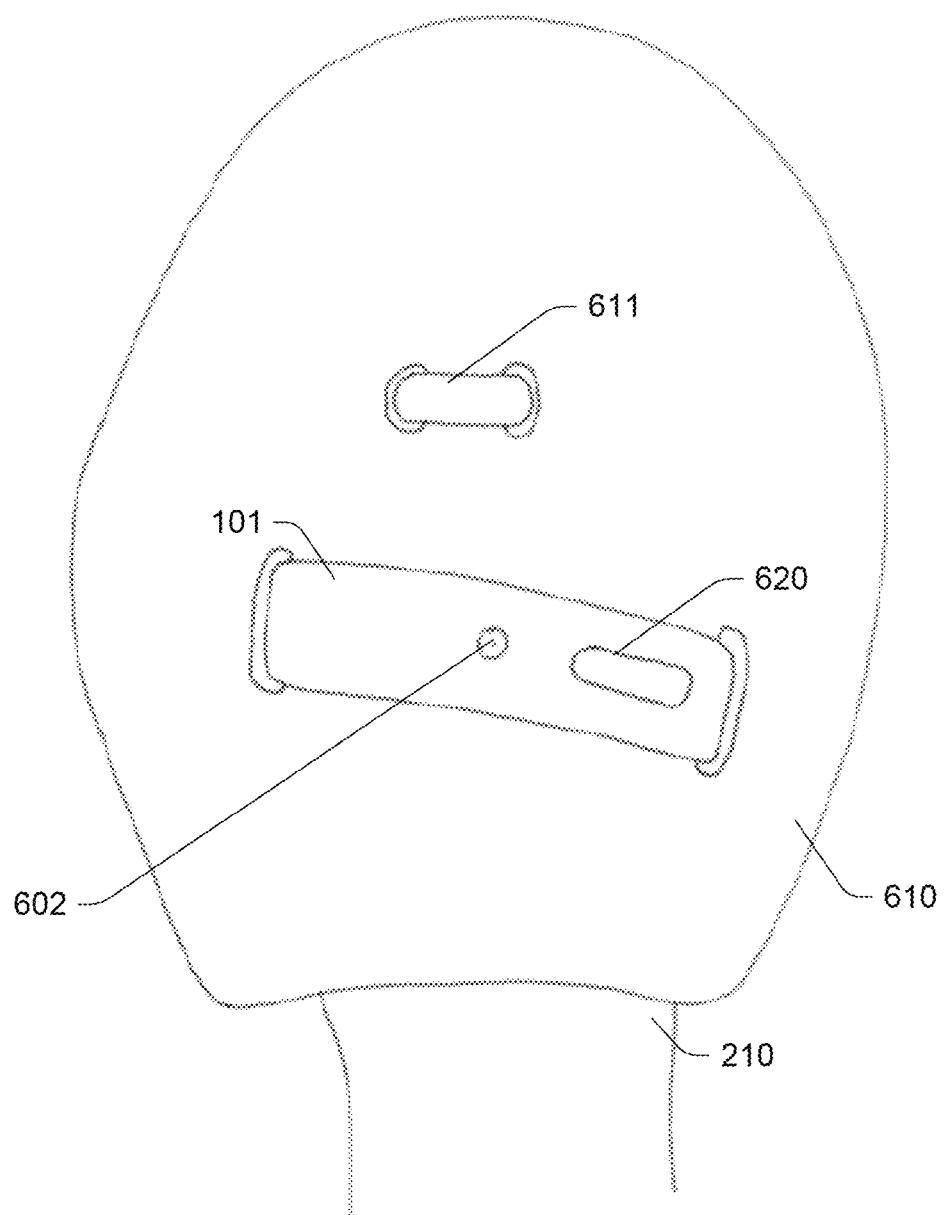
FIG. 6B is a bottom view representation of the wearable sensor device of FIG. 6A.
Figure 6C:
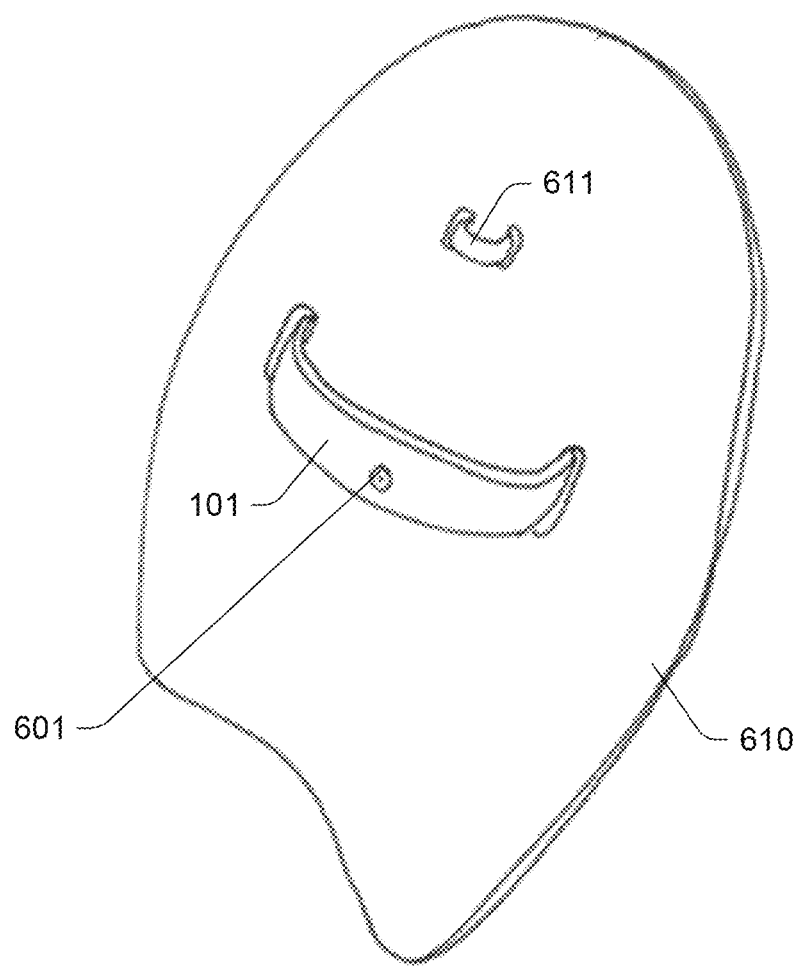
FIG. 6C a top right orthogonal view representation of the wearable sensor device of FIGS. 6A and 6B, shown not in use.

FIGS. 6A to 6C show device 101 as part of a paddle configuration with least two pressure sensors 601 and 602, a display 620 and an IMU (not shown), this embodiment including a paddle 610 that is strapped around the palm of the swimmer's left hand by device 101 and to a middle finger 609 of the swimmer's left hand by a secondary strap 611.

Figure 7A:
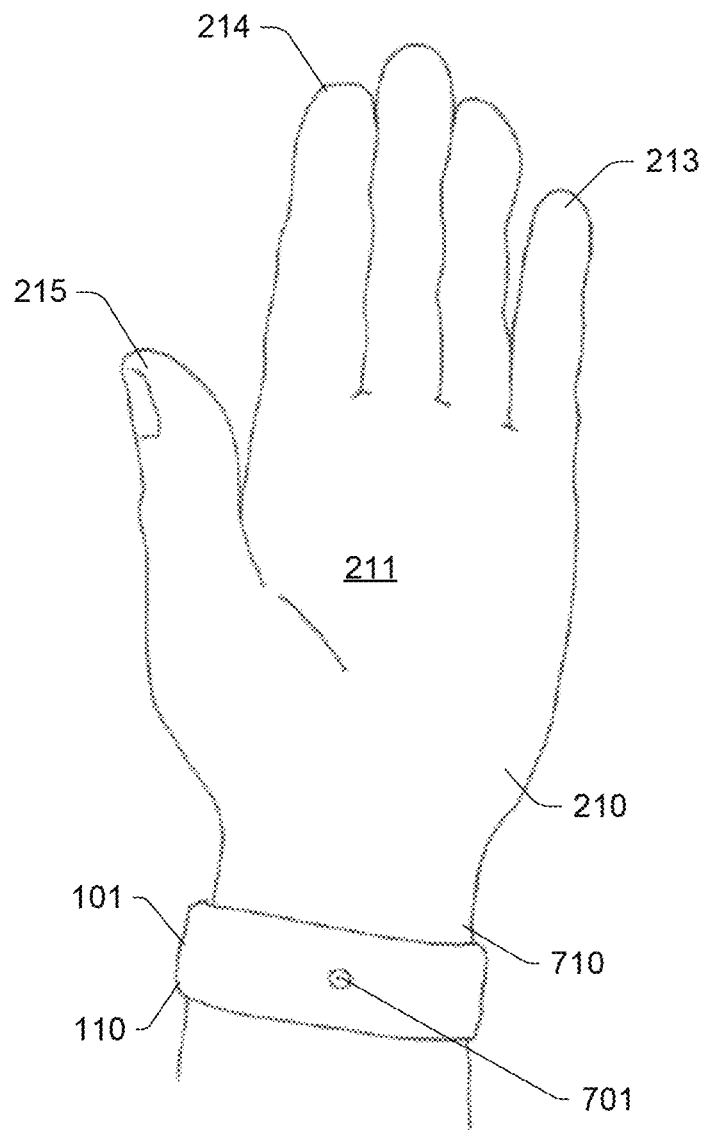
FIG. 7A is a bottom view representation of an alternate embodiment of a wearable sensor device of the system of FIG. 1 in use.
Figure 7B:
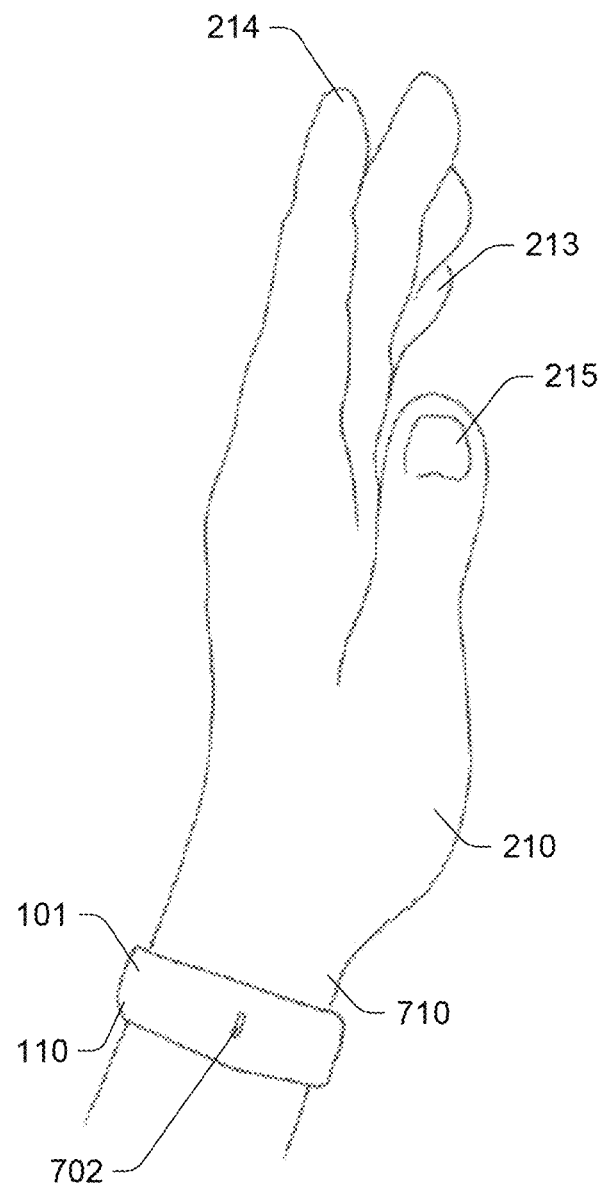
FIG. 7B is a right side view representation of the wearable sensor device of FIG. 7A.
Figure 7C:
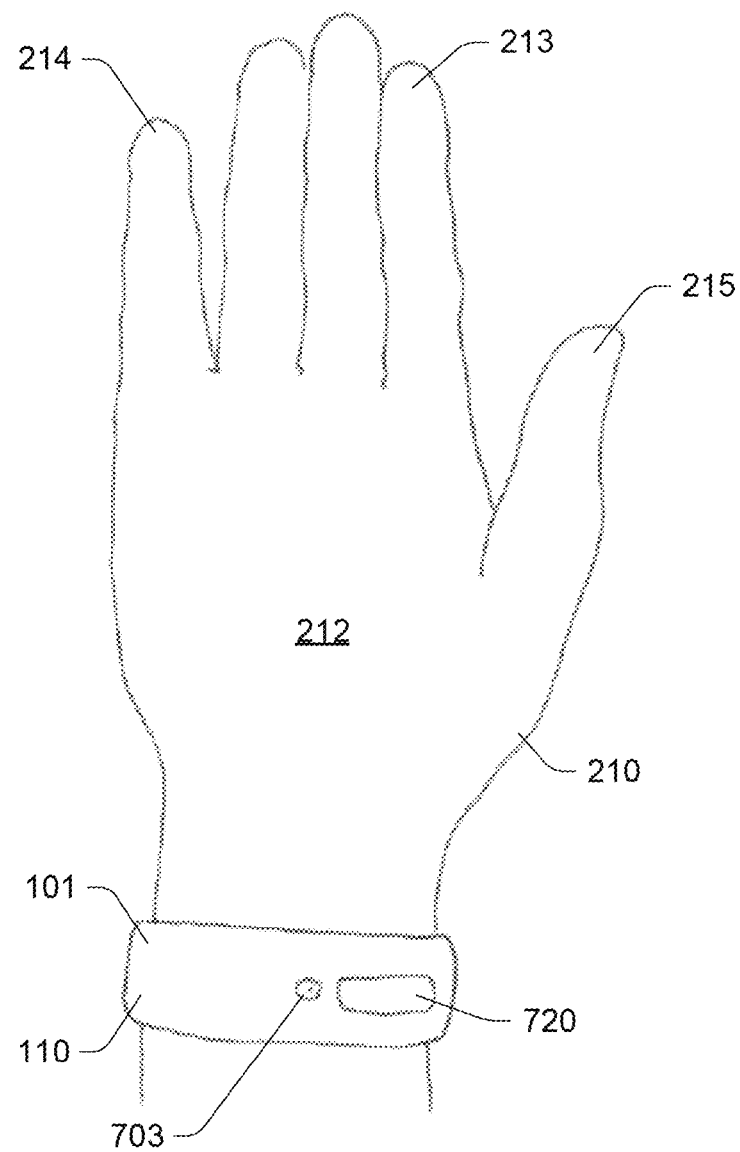
FIG. 7C is a top view representation of the wearable sensor device of FIGS. 7A and 7B.

FIGS. 7A to 7C show device 101 as wrist-worn device with three pressure sensors 701, 702 and 703, a display 720 and an IMU (not shown), this embodiment adapted to be worn around a left wrist 710 of the swimmer.

Figure 10:
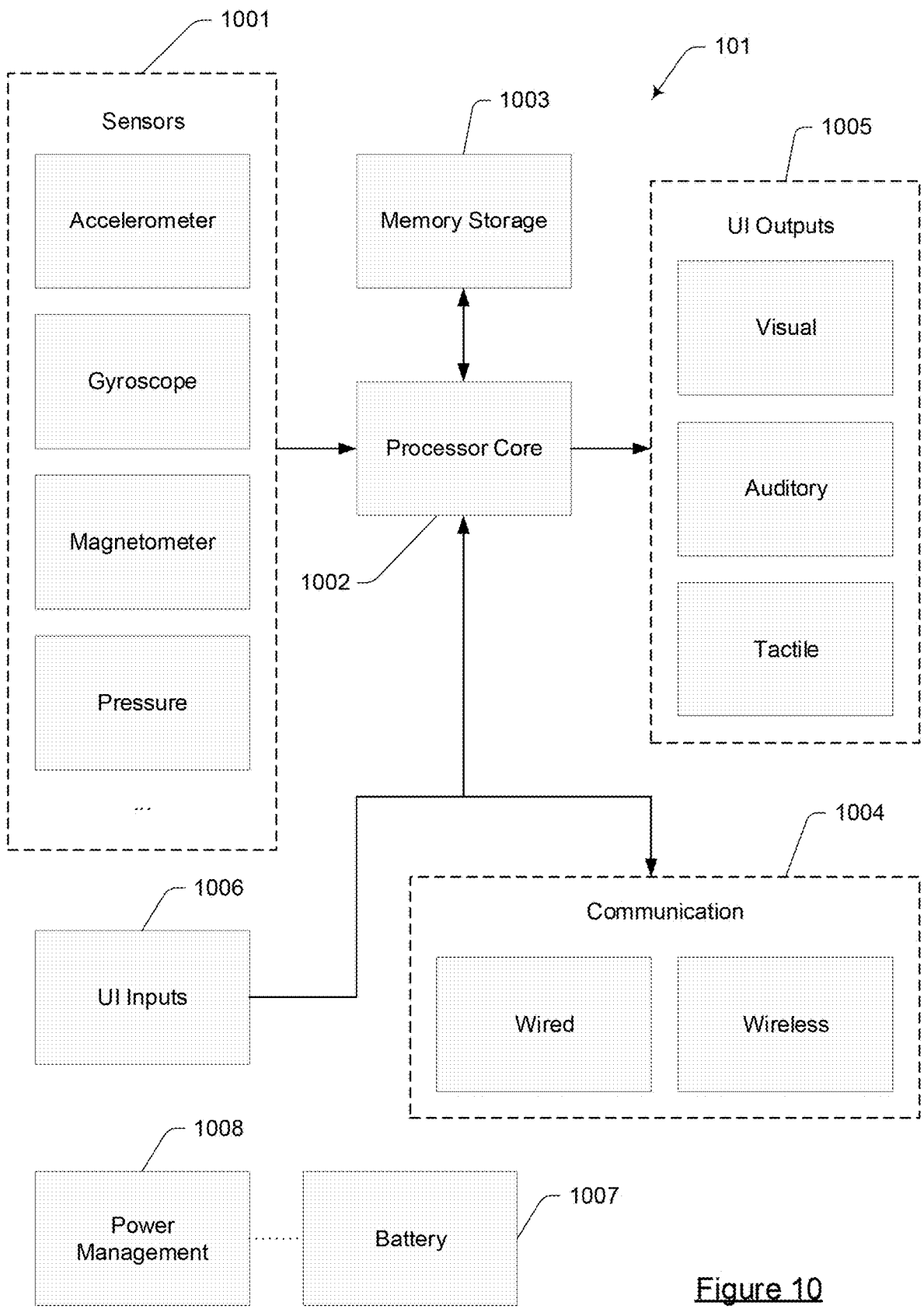
FIG. 10 is a conceptual block diagram of the hardware of the wearable sensor device.

Referring now to FIG. 10, a more general schematic of the architecture of an embodiment of device 101 is shown. More specifically, the sensors described above are collectively represented by reference 1001 and includes such hardware as an accelerometer, a gyroscope, and a magnetometer (which are collectively included in IMU 205, as mentioned above) and a pressure sensor, representative of pressure sensors 201, 202, 203 and 204 collectively. Sensors 1001 provide input to a processor core 1002, representative of the microprocessor discussed above, which is in communication with a memory storage module 1003 and a communication module 1004. Module 1004 includes wireless communication hardware, representative of the Bluetooth transceiver and ANT+ hardware discussed above. Processor core 1002 provides input to user interface outputs 1005, which includes visual output (such as display 220), auditory output (via a headset or headphones worn by the user) and tactile output that engage with the user of device 101. Also included in device 101 is user interface inputs 1006 (such as the general use button) that provides input to processor core 1002 and communication module 1004. Finally, device 101 includes a battery 1007 and a power management module 1008 for collectively powering device 101 and optimising the power efficiency of device 101.

Modelling and Measurement of Forces

In order for the data taken from device 101 to be useful, software modelling is required so that the data can be applied to that software model to formulate meaningful results. Specifically, three separate force models are required to provide estimates for a drag force, a first lift force and a second lift force. Each force model is created to provide an estimate of forces with optimal accuracy, and the models can then be used in real-time to calculate the corresponding forces that a user is generating. Each model of the forces is created in the same basic way using a number of input variables, mostly sensor data. As such, reference to "the model" is taken to relate to any, or any combination, of the three separate force models.

In a preferred embodiment, the model is developed using a set of test data that is acquired with a mechanical rig configured to measure the forces on a rig fixture which has roughly the same shape and the same sensor configuration and placement for device 101. The model created is then used live where the input data is fed into the model from each data source (such as a pressure sensor or IMU) in a corresponding fashion to each data source of the test data. In other words, data acquired from a certain sensor that is positioned in a certain place is compared to the 'force estimate with optimal accuracy' equivalent from the same sensor. At least one measurement (whether direct or derived) is taken from each of: at least one of pressure sensors 201 and 202; and IMU 205. Since a correlation exists between force, pressure and inertial and positional measurements then the combination of all of these factors improves the accuracy of the force estimate. The process of creating the model involves deriving the weights to all the input variables that results in the most accurate force measurement.

In a preferred embodiment, the model is created using statistical modelling techniques such as regression analysis. Regression models include linear regression model, multiple linear regression model, polynomial regression model, non-linear regression model and nonparametric regression model, amongst others. In other embodiments, modelling techniques include decision tree regression, K-nearest neighbour algorithms, artificial neural networks and support vector machines.

A number of types of variables data can be obtained from pressure sensors 201 and 202 and IMU 205, including pressure signals, differential pressure signals, linear accelerations, linear velocities, linear displacements, angular accelerations, angular velocities, angular positions, orientation, angles of attack, depth, swimmer direction of movement, swimmer velocity, variables at previous time points, or any combination thereof. Furthermore, other sensors can also be included that track other relevant factors such as temperature, which can also be combined with any of the above types of variables data.

In relation to swimming, input data from IMU 205 allows system 100 to infer the swimmer's forward direction. Furthermore, the presence of IMU 205 provides data to detect the swimmer's hand angle throughout a stroke, detect the swimmer's hand displacement throughout a stroke, decomposes forces generated with respect to the forward direction, calculates hand velocity and infers body velocity. Furthermore the combination of input data from pressure sensors 201 and 202 and IMU 205 allows system 100 to identifies the swimmer's stroke segmentation and phase.

The rig fixture, appropriately, is the shape of a human left hand. In other embodiments, the rig fixture takes the shape of other parts of the human anatomy such as a foot. In this case, a totally different configuration of device 101 would be used, such as a sock-like form factor to the swimmer's foot. In another embodiment, the rig fixture takes the form of a human arm and the configuration of device 101 is different again, such as a band form factor mounted on the wrist of the arm.

The data obtained from pressure sensors 201, 202, 203 and 204, namely the pressure differential, is used to remove the influence of hydrostatic pressure (except for any difference in depth between the two sensors). In other embodiments, the data obtained from IMU 205 is used to remove the influence of hydrostatic pressure namely through double integration of the accelerometer to calculate depth. In another embodiment, data from IMU 205 and pressure sensors 201, 202, 203 and 204 are able to be used in combination through sensor fusion to create a state estimate of the depth which is then used to remove the hydrostatic component of the pressure signals. In addition to the aforementioned embodiments, in other embodiments IMU 205 can be used to account for the different hydrostatic pressures at the different sensor locations depending on the orientation of the hand in the water.

In an embodiment, the raw input data is filtered before being passed through to the model. This can take the form of a single or a combination of linear, nonlinear and frequency filters, such as high pass filters, low pass filters, bandpass filters, Butterworth filters, alpha-beta filters, and Kalman filters. Such filtration will allow provide cleaner data to the model to create a more accurate result. More specifically, depending on the type of filtering and on what data (such as the raw data or estimated states such as force from the model), filtering removes high frequency noise that is inherent from the sensors, removes low frequency biases in the sensors that could affect the accuracy (that is, accelerometer bias), places the data in a more orderly state for more accurate results in other algorithms (that is, for peak detection algorithms), and provides visually simpler data to present to the user.

In some embodiments, a state estimator is used before the data is passed into the model, the state being passed into the force model as an input variable. A state estimator is further used, in some embodiments, proceeding the force model where the calculated force is used to estimate other states. The state estimator could take the form of, but is not exclusively, a linear quadratic estimator or Kalman filter, that reduces statistical noise and creates an estimate of the chosen states that would be more accurate than an average or a single measurement alone. States include the measurements from pressure sensors 201 and 202, measurements from IMU 205 or any other measurements made, as well as any combination of the input data that can be combined to form new states, for example, orientation, swimmer direction and velocity. The state estimator can also use the force output generated from the model as a state for outcomes related to higher order functions of device 101, including but not limited to swimming direction, stroke counting, and hand position information.

In one embodiment, machine learning techniques are used for stroke start/end segmentation, stroke type classification, stroke phase identification, and swimming or resting classification. In another embodiment, heuristic algorithms or fuzzy logic is used.

In some embodiments, heuristics, fuzzy logic or the like is applied to the performance metrics which in turn can be used to formulate coaching feedback in the form of text, video or audio. In such embodiments, the form of the swimmer is able to be flagged and presented to the swimmer to help to improve their performance. The feedback provided to the swimmer includes feedback on technique, possible out-of-pool exercises to help with swimmer performance and general swimming tips, amongst others.

Figure 11:
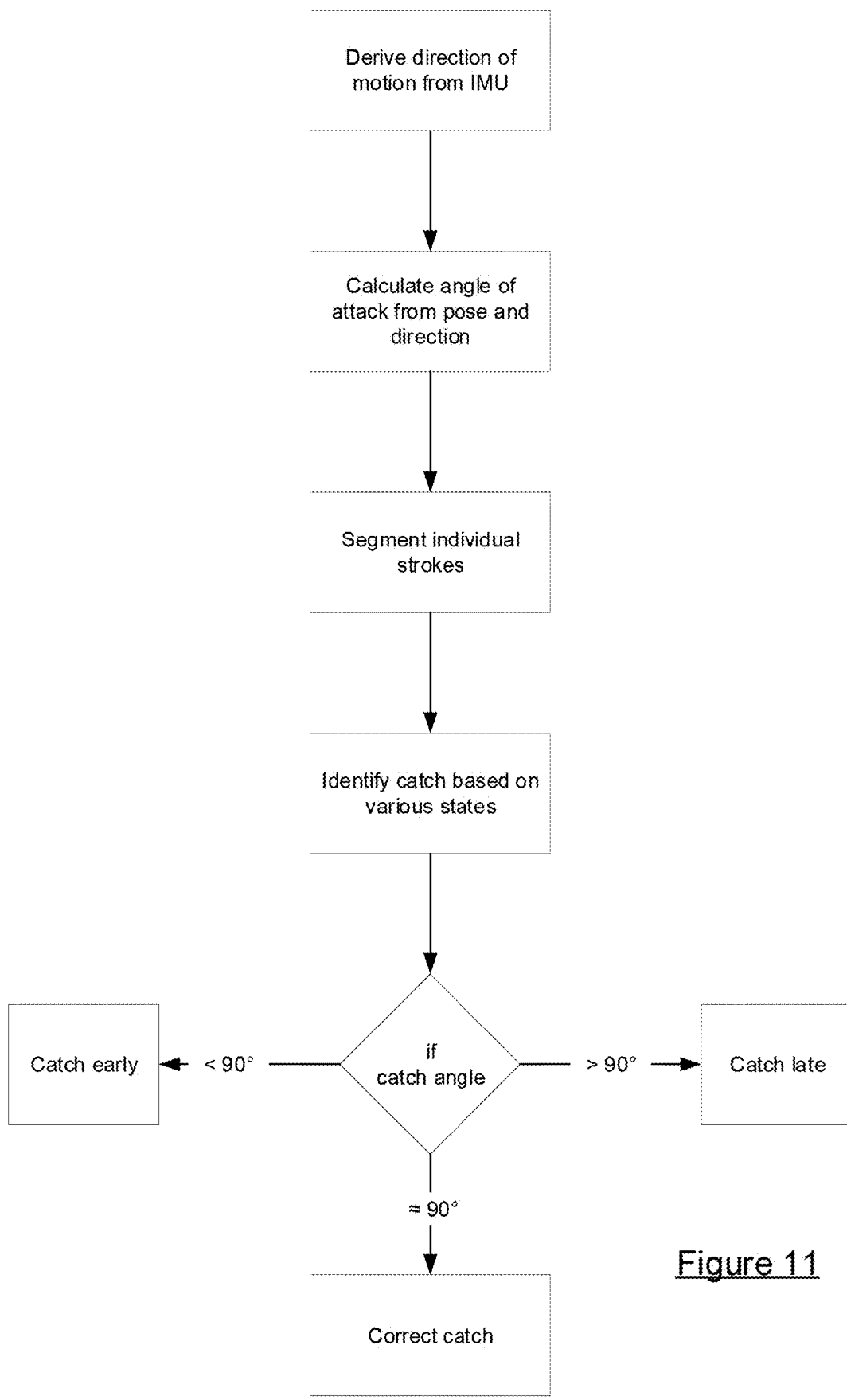
FIG. 11 is a flowchart diagram graphically illustrating a feedback algorithm.
Figure 12:
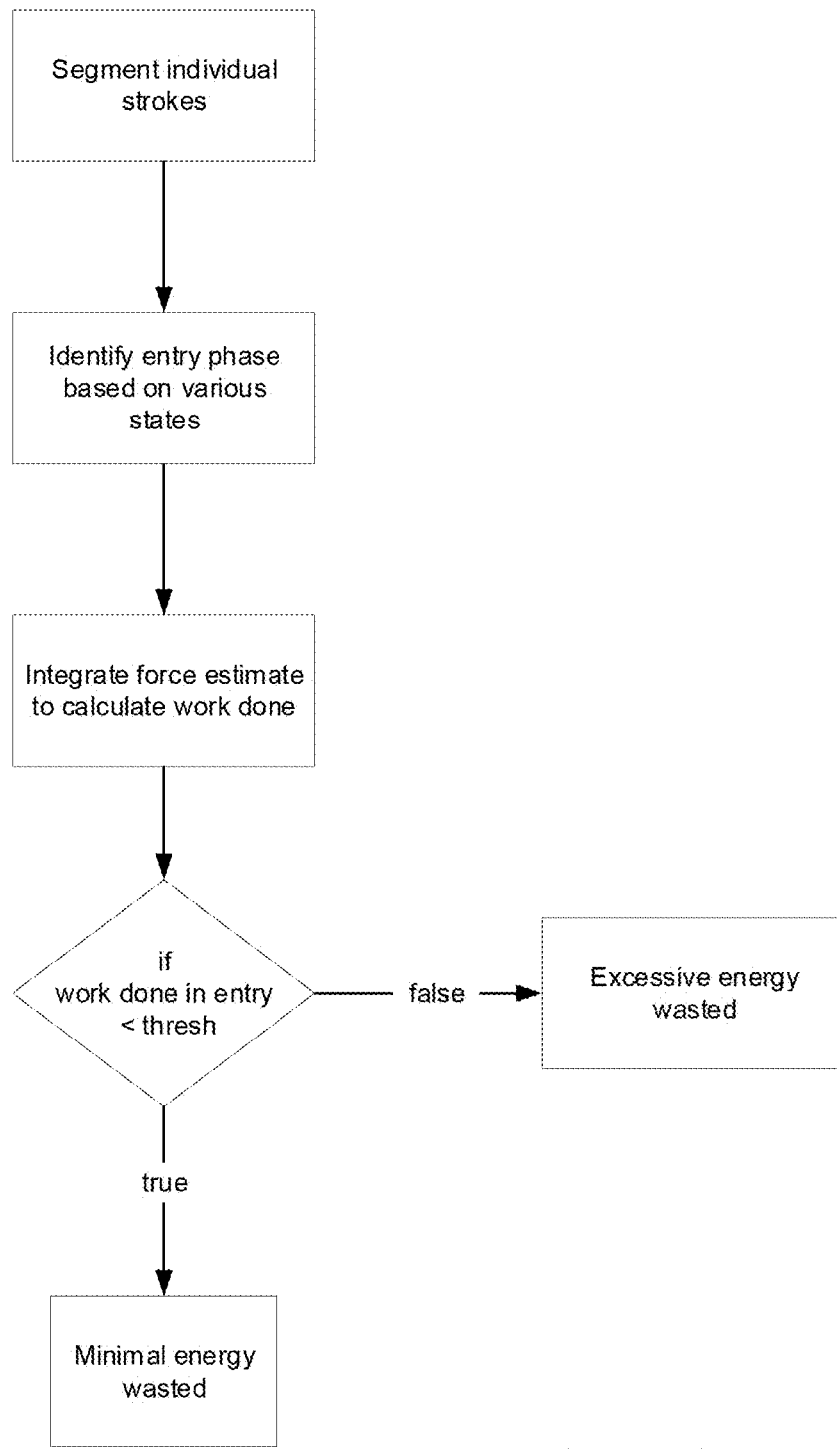
FIG. 12 is a flowchart diagram graphically illustrating a feedback algorithm.
Figure 13:
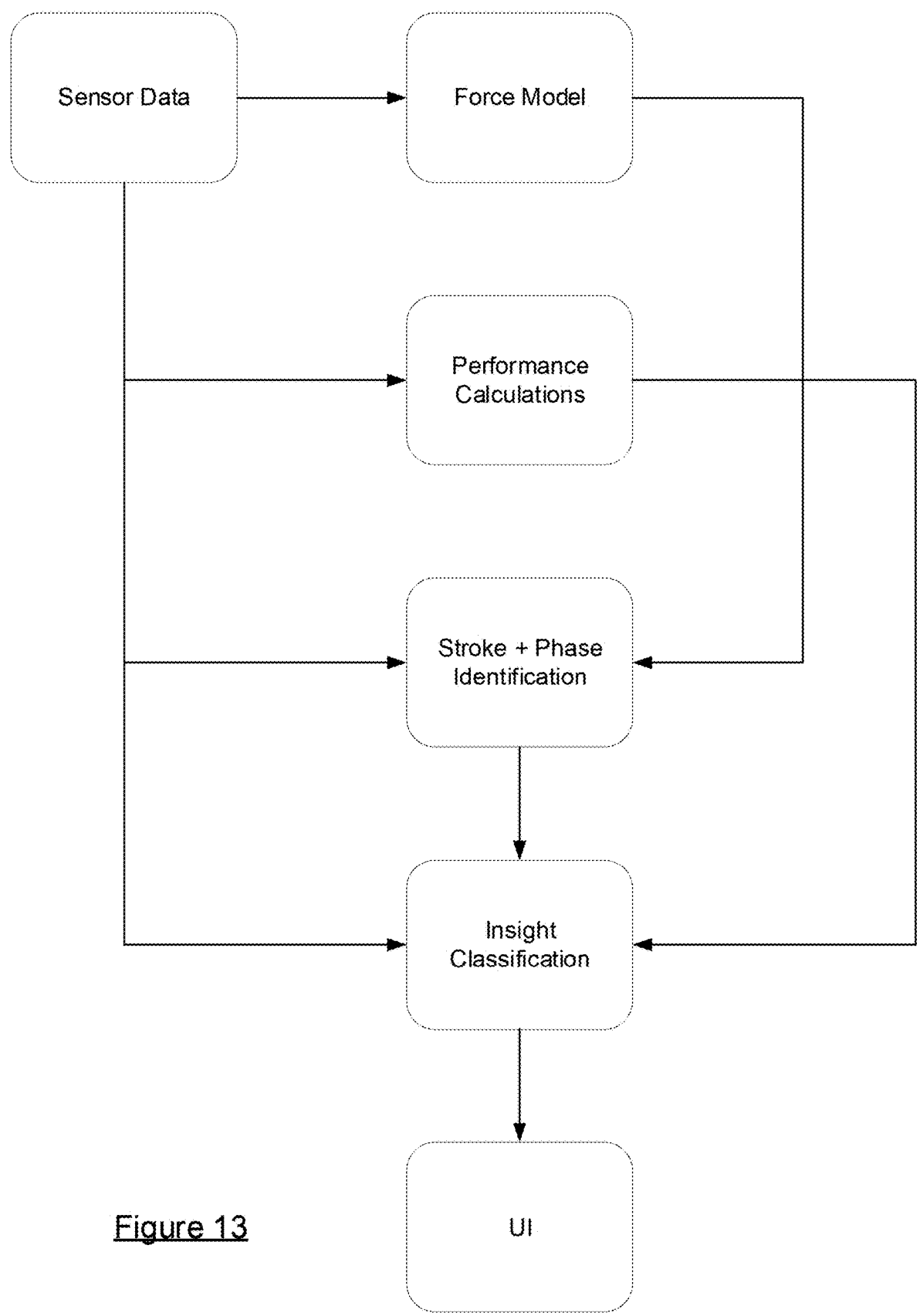
FIG. 13 is a flowchart diagram of the general process of the system of FIG. 1 including the force model of FIG. 9.

Illustrated in the flow charts of FIGS. 11 to 13 are examples on how the coaching feedback is provided to the swimmer.

Referring to FIG. 11, there is illustrated an algorithm to provide feedback on a catch position of a swimmer. Firstly, the direction of motion is derived from data from IMU 205, and then the angle of attack is calculated from the pose (that is, the shape of the hand/arm) and direction of the motion. The swimmer's individual strokes are then segmented and the catch position is identified based on the various states of the segments. Finally, the catch angle is found and feedback will be provided based on the angle being under 90° (catch early), over 90° (catch late) or approximately 90° (catch correct).

Referring to FIG. 12, there is illustrated an algorithm to provide feedback on efficiency of a swimmer's stroke entering the water. Firstly, the swimmer's individual strokes are then segmented and the entry phase is identified based on the various states of the segments. The force estimate from the model as described above is integrated to calculate the total 'work done' upon the swimmers stroke entering the water and this 'work done' is compared to a threshold. Feedback will be provided if the 'work done' is less than the threshold (minimal energy is wasted) or if the 'work done' exceeds the threshold (excessive energy is wasted).

Referring to FIG. 13, there is illustrated a more general flowchart showing how the sensor data is converted to feedback. Namely, the sensor data (from pressure sensors 201, 202, 203 and 204 and IMU 205) is inputted into the force model, the performance calculations, the stroke and phase identification, and the insight classification. Furthermore, the output of the force model is also inputted into the stroke and phase identification, and the output of the performance calculations and the stroke and phase identification are also inputted in the insight classification, which in turn provides the feedback to the swimmer by way of the user interface (UI).

Figure 19A:
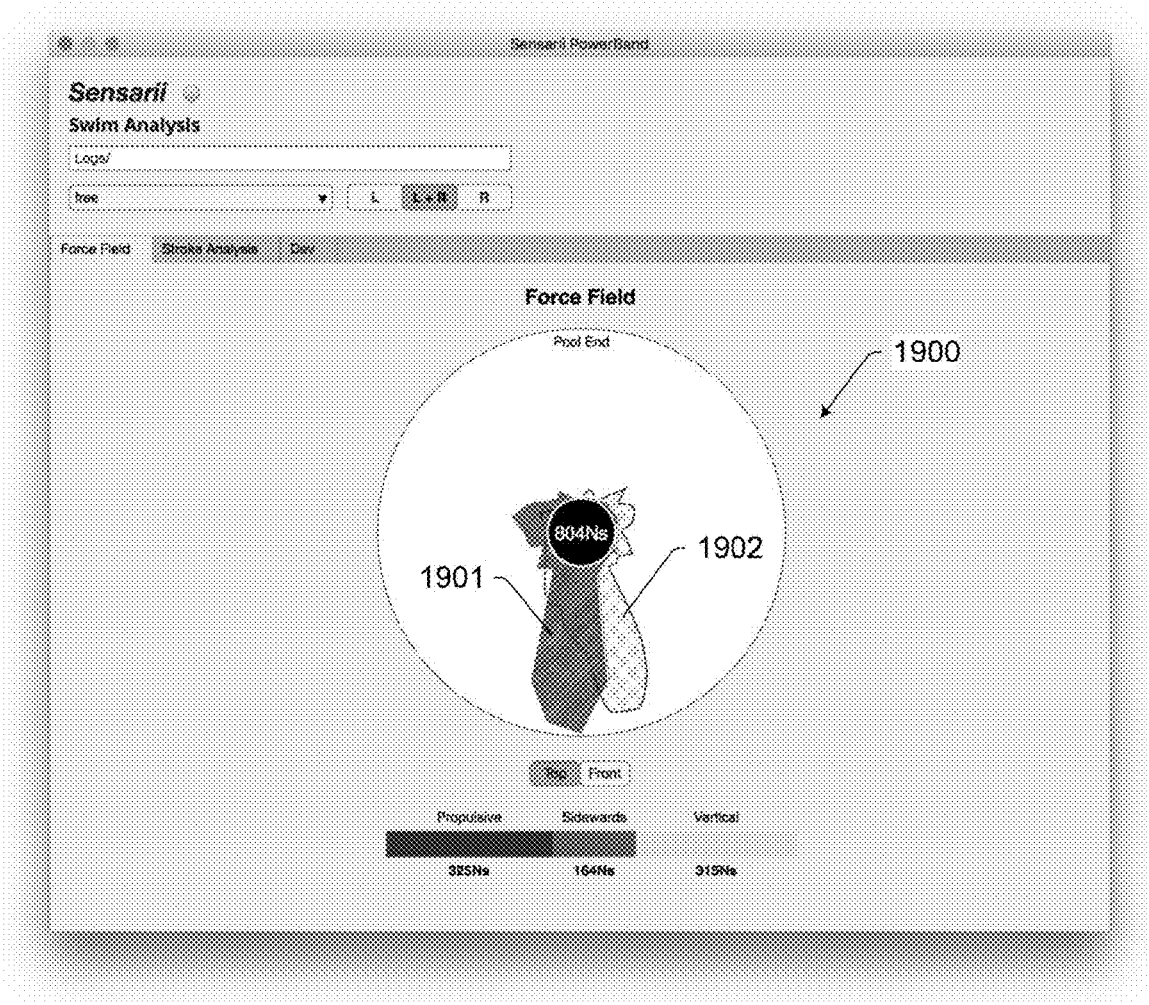
FIG. 19A is a view of an embodiment of a circular plot output display showing a motion of a user.
Figure 20A:
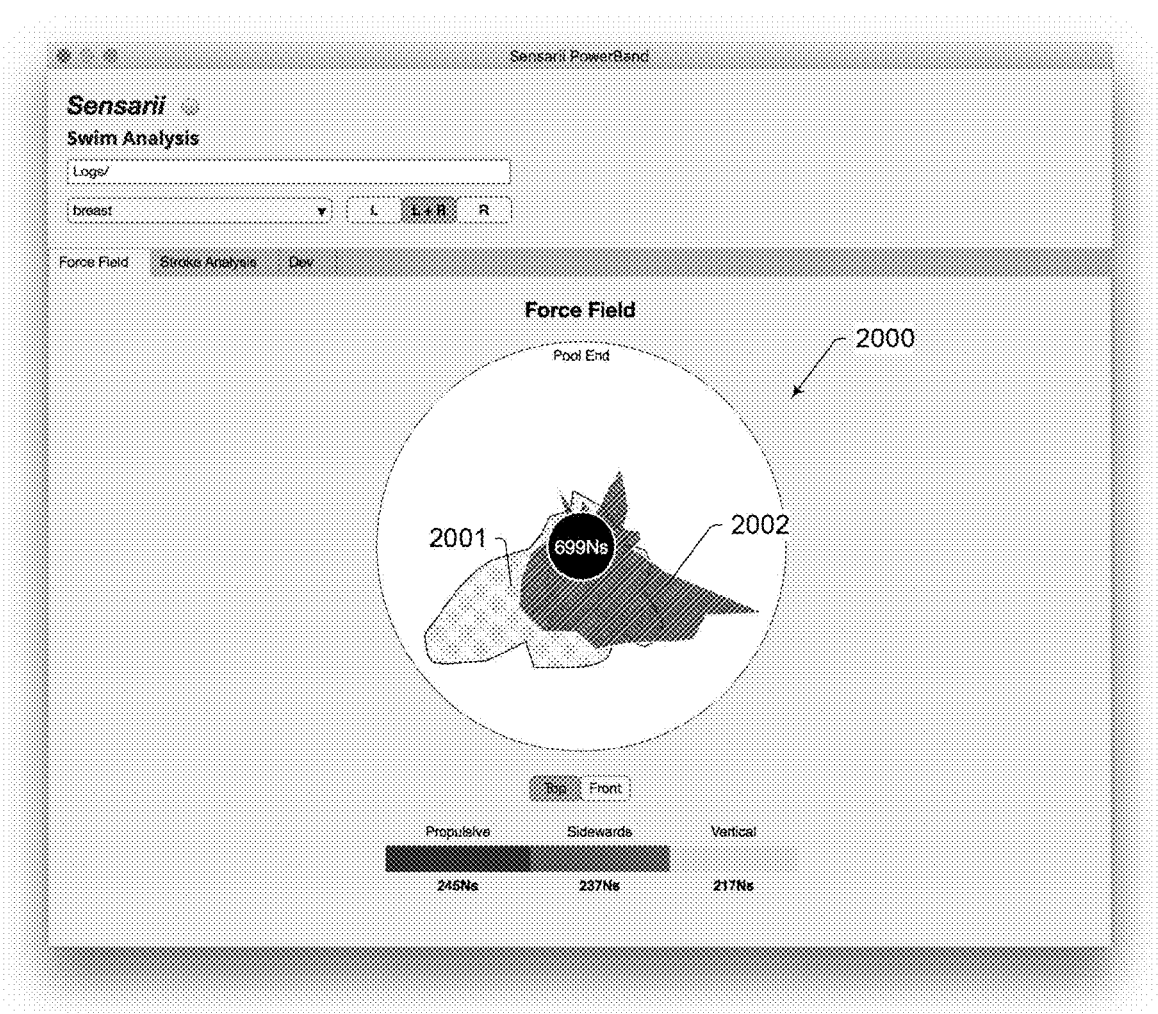
FIG. 20A is an alternate version of the circular plot output of FIG. 19A showing a different recorded motion.

Referring now to FIGS. 19A and 20A, there is shown two possible outputs of a circular plot (denoted by reference 1900 in FIG. 19A and 2000 in FIG. 20A) showing a distribution of forces from the user with respect to the forward direction of the user. FIG. 19A shows a fairly efficient stroke whereas FIG. 20A shows a stroke that is far less efficient. More specifically, the two shaded areas 1901 and 1902, and 2001 and 2002 respectively, show the force for the left and right hands of a swimmer where the portion of areas 1901, 1902, 2001 and 2002 towards the top of the circular plot display represent forces in the backward direction (that is, opposing the desired forward direction), the portion of areas 1901, 1902, 2001 and 2002 towards the bottom of the circular plot display represent forces in the forward direction, and the portion of areas 1901, 1902, 2001 and 2002 towards the left and right sides the circular display represent forces left and right directions, respectively, with respect to the forward direction.

Figure 19B:
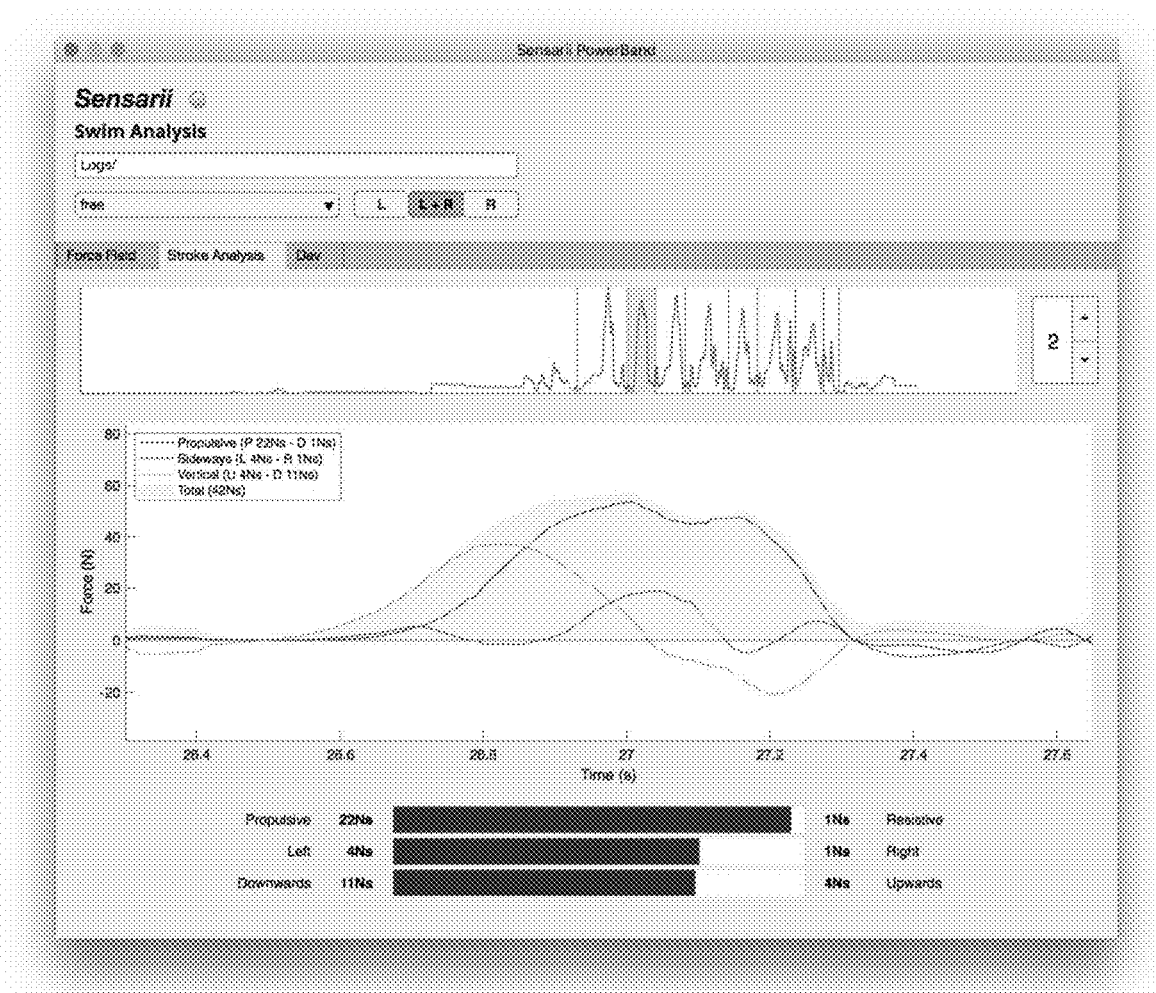
FIG. 19B is a view of an embodiment of a linear plot output of the motion shown in FIG. 19A.
Figure 20B:
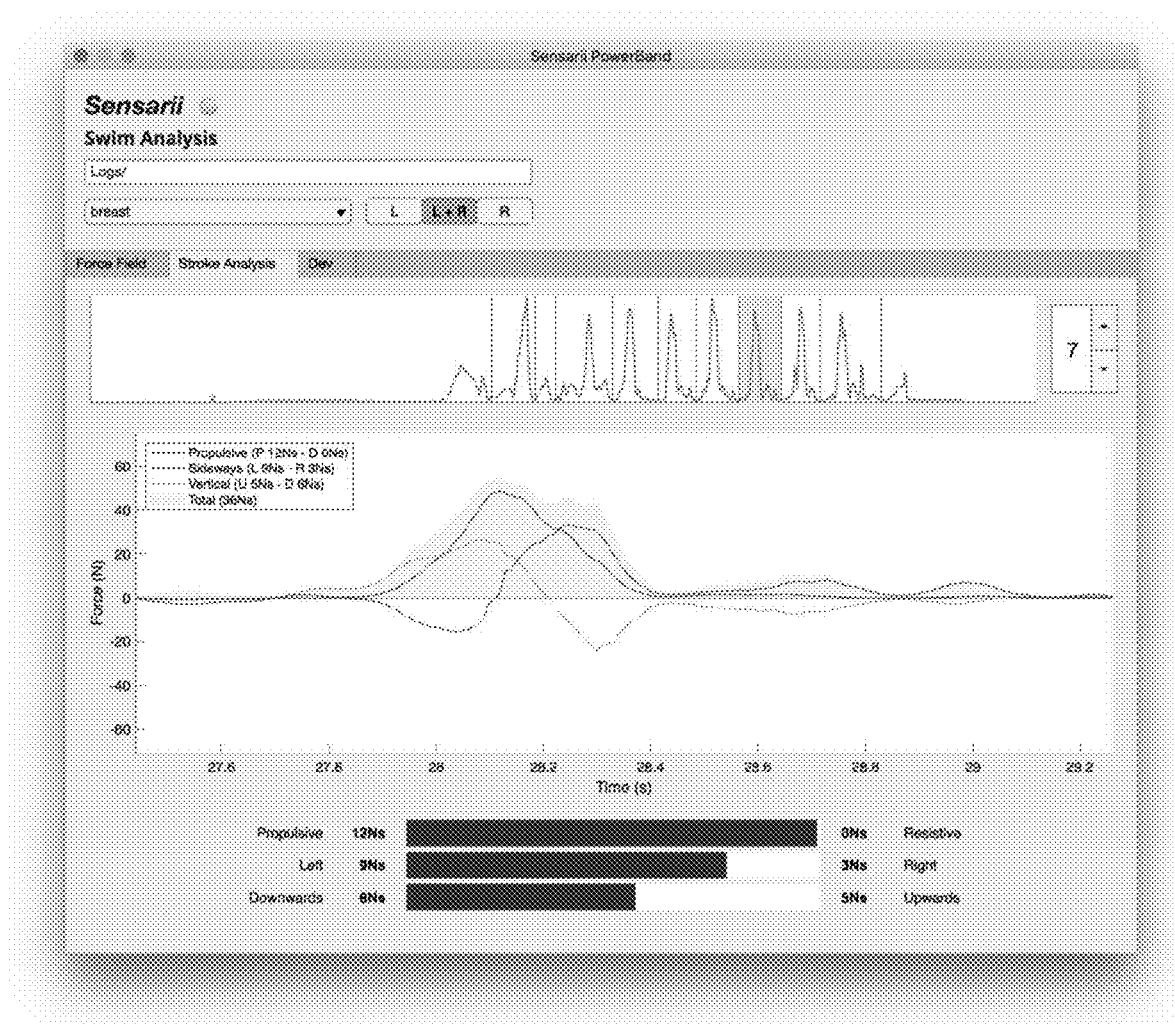
FIG. 20B is a view of an embodiment of a linear plot output of the motion shown in FIG. 20A.

The forces estimated from the force model provide force and impulse components in the propulsive, sideways and vertical directions relative to the forward direction. The circular 360° plot created by first segmenting the plot into a plurality (n) of bins, where the more bins used, the more accurate the result. From each estimated force or impulse outputted from the force model, a corresponding direction of force is calculated in a chosen plane, in this case a horizontal plane (that is, from the point of view of looking down on a swimmer from above). The magnitude of the estimated force or impulse is accumulated into the appropriate bin, based on its corresponding direction of the force or impulse, to produce graphical data. This data is firstly plotted as a line graph (shown in FIGS. 19B and 20B) and then this line graph is transformed into the 360° polar plot graph (of FIGS. 19A and 20B respectively). The outcome is that the 360° polar plot graph is representative of a real-world physical motion in 2D space.

It is noted that the use of firstly plotting the linear graph and then transforming this to a circular plot provide a technical advantage in that it is able to more efficiently display the 360° polar plot using less processor power. It will be appreciated by those skilled in the art that much more processor power would be required to run a comparatively complex plotting algorithm that produces a more complex 360° polar plot. However, the inventor's utilisation of a fairly simplistic linear plotting algorithm followed by another simple transformation algorithm provides processor efficiencies that would otherwise not be enjoyed.

Furthermore, the information in FIGS. 19A and 20A (along with FIGS. 14 to 18) and as mentioned above, provides direct and instantaneous feedback to the swimmer as to where forces are being directed during their stroke and, hence, the swimmer can easily see how to correct any misdirected forces.

The model created from the mechanical rig forms part of the software that is readable and executable on external computer unit 115 such that the input data is processed and analysed, and the efficiency is provided to the swimmer.

Finally, other factors can be manually inputted into the model to create more accurate performance metric, including hand variables such as hand size, finger spread and degree of cupping of the hand. For example, in an embodiment, different discrete hand sizes (such as a small, medium, and large sized hand, or a numerical scale of hand sizes from 1 to 10, with 1 being the smallest and 10 the largest) are able to be inputted into the model where the user selects whatever is closest to their hand size. Similarly, this can be applied to the modelling of other body parts.

In one embodiment, device 101 is the shape of a glove with flex sensors (or similar technology) that is able to measure such hand variables directly and therefore allows the system to automatically accounts for these variable in the force model for greater accuracy.

In very broad terms, the performance metric is calculated by assessing the proportion of force magnitude that is in a forward direction. This is calculated by augmenting pressure data from the at least one pressure sensor with inertial data from the IMU.

The performance metric is derived from the drag force, the first lift force and the second lift force which are each calculated from one of the force models.

Figure 9:
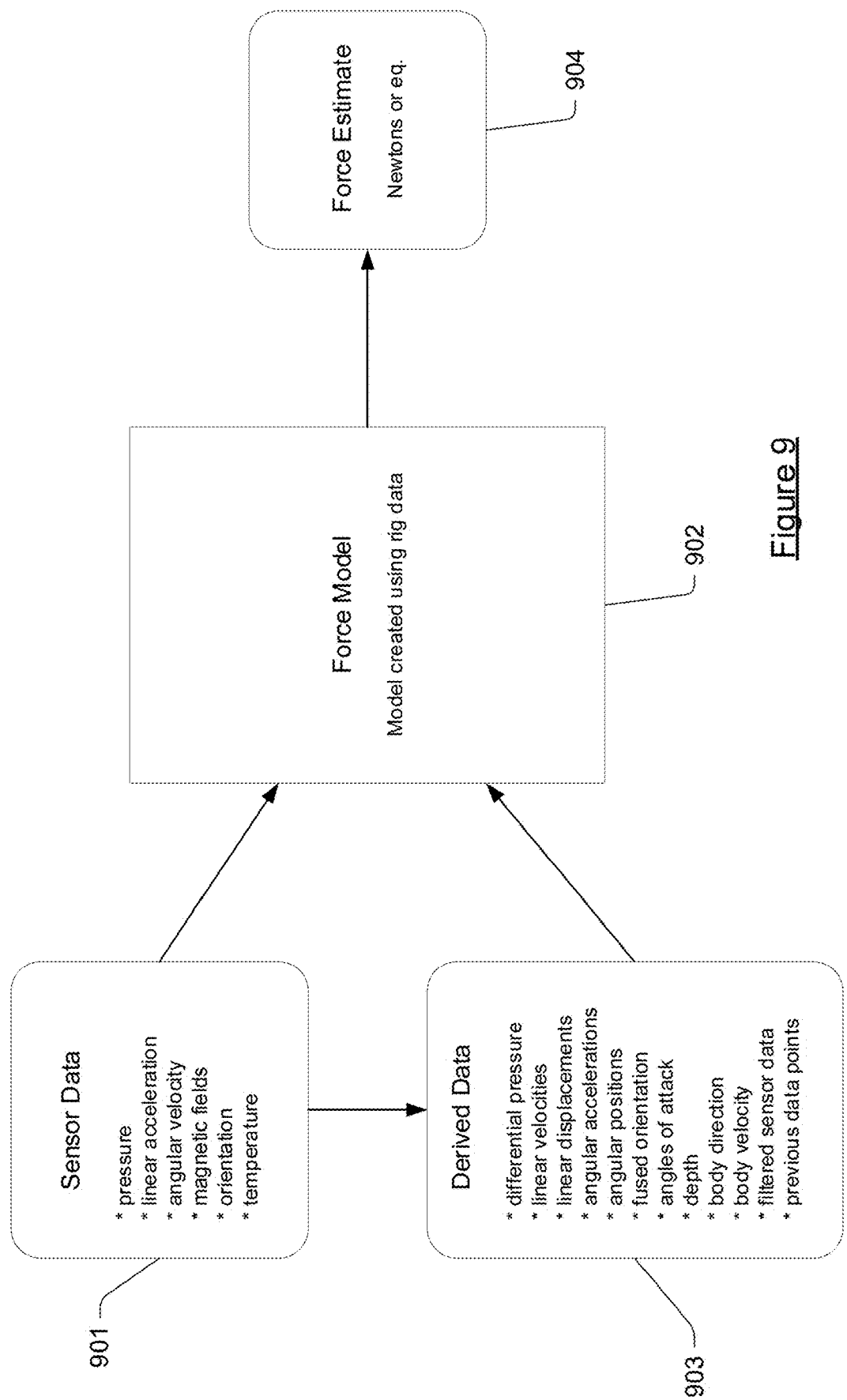
FIG. 9 is a conceptual block diagram of the system showing the major components of the force model of the system of FIG. 1.

FIG. 9 is a simplified block diagram that illustrates the process behind the force model. As mentioned above, the sensor data (reference 901) is fed into the force model (reference 902) and/or is fed into a module (reference 903) in order to process the sensor data to obtain derived data that is subsequently fed into the force model 902. The force model then outputs the force estimate (reference 904). In various embodiments, the derived data further includes but is not limited to one or more of: the state estimator; and double integrator. As noted above, these three separate models are used to estimate the drag, first lift and second lift forces, and can be denoted as the 'x', 'y', and 'z' forces.

CONCLUSIONS

The present invention seeks to overcome and/or ameliorate one or more of the above limitations or deficiencies.

System 100 provides an accurate, reliable and valid measurement of the fluid forces exerted by swimmers that is understandable and actionable by swimmers, coaches and biomechanists. Improving the accuracy, repeatability and validity of a force estimate of a water sports motion is a complex process. While force, pressure and acceleration are related metrics, there are a myriad of factors that contribute to the calculation of one from the other. For example, a force can be calculated through the multiplication of acceleration and mass. While acceleration can be acquired from an accelerometer or a positional sensor, the mass is not just the mass of the object moving throughout the water but also the 'added mass', which is the mass of the water the hand pushes along with it. This in turn, is a function of the hand angle, the hand size, and the degree of abduction of the fingers, among other factors. Likewise, if pressure sensors are used, where force is calculated as the area multiplied by the pressure, the object has a pressure profile that is not necessarily representative of the single or multiple pressure points chosen. The pressure across the object varies in a non-uniform fashion with increasing complexity depending on the shape of the object. Depending on the number and positioning of the pressure sensors, there may not be enough information to develop a wholesome estimate of the forces acting on the hand if, for example, the hand is moving through the water at a very small 'angle of attack'. System 100 describes a systems and methods to improve the accuracy, repeatability and validity of the force vector estimate given these complexities.

Athletes, especially elite athletes, rely on their tools to be accurate, repeatable and valid so that subtle changes in their technique or performance can be accurately measured, evaluated and worked upon. It is these small changes that can contribute to great improvements in performance, especially for swimming. It is also needed so that athlete performance between day-to-day sessions, or even sessions months and years apart can be reliably compared. Accuracy, repeatability and validity also plays a large part when comparing the datasets of different athletes. There might be greater variations between swimmers, for example, with different hand sizes, that are difficult to account for given the aforementioned methods described for generating force data. Accuracy, repeatability and validity are also essential when comparing the dataset to other metrics that can be important to the athlete, for example, lap times and calories used.

In some embodiments, system 100 employs machine learning to develop a complex force model using a multitude of sensor data from device 101. The model created correlates drag and lift forces to hand pressures at various hand velocities and angles. The force model employs the use of IMU data in addition to the pressure sensors to greatly improve accuracy and deal with the hydrodynamic complexities of the swimming motion.

The use of two pressure sensors (201 and 202) positioned around the hand allows system 100 compensate for the hydrostatic pressure, ensuring greater accuracy over methods involving only the use of an IMU.

There are many advantages of system 101 over known products, and these include:

- The use of a multitude of pressure sensors feeding into the force estimation which are disposed, in use on strategic locations on the hand and/or forearm. These additional data points of the fluid flow are used in the model to improve model performance and therefore accuracy.
- The use of sophisticated mathematical modelling including regression, decision trees and neural networks. As fluid dynamics is highly nonlinear and complex, such advanced models will provide more accurate estimates of the forces produced.
- User-specific variables can be accounted for (for example, hand size, finger spread, degree of cupping amongst others) which provides improved accuracy in the force estimate between users or if a user changes their hand shape.
- The use of the angle of attack, derived from the velocity vector and orientation, to calculate the 3-axis force estimation (drag force, first lift force, second lift force). This provides a much higher force estimation accuracy, as all known existing products estimate only the drag which may exclude up to 30% of the total force generated.
- Use of IMU data as an additional input in the force estimation (that is, angle of attack, acceleration, and velocity, amongst others). This IMU data (and derived estimated states) is a different paradigm to pressure and significantly improves performance of the model.
- The use of two or more pressure sensors mounted on distinct parts of the hand also provides input data for to compensate for hydrostatic pressure. Such a compensation method is far superior to double integrating IMU data which relies on assumptions (for example, density of water) and produces large errors due to acceleration drift.

Using the IMU data to infer swimmer forward direction, which is essential in order to calculate effective swimming force.

Using the IMU data to detect hand angle throughout a stroke enables swimmers to monitor the hand orientation and adjust this aspect of their stroke to increase swimming efficiency.

Using the IMU data to detect hand displacement throughout a stroke enables swimmers to monitor hand displacement and adjust this aspect of their stroke to increase swimming efficiency.

Using the IMU data to decompose forces generated with respect to the forward direction, which is essential in order to calculate effective swimming force.

Using the IMU data to calculate hand velocity and infer body velocity. This enables calculation of power generated (as opposed to just force).

Stroke segmentation and phase identification using IMU data and/or pressure sensor data, also using force data from the model. This helps users to generate insights on a stroke-by-stroke and intra-stroke level.

The on-device display provides immediate feedback while swimming (on metrics selected by the user) and allows for interfacing with training programs.

The general-use buttons allow different metrics to be cycled through on the display and, for example, allows the swimmer to select training programs.

IMU 205 allows for user interface interactivity including motions or actions to activate functions. These include a 'double tap' or 'raise to wake' motion functions.

Device 101 is worn around the palm as opposed to the fingers and strapped on in a ring-like manner. This configuration leaves the fingers of swimmers unobstructed with is far more preferable to they can get a better 'feel of the water'. Furthermore, finger spread also varies between swimmers, which would be unaffected by the present design. Finally, the palm is also a superior sensing location since a larger amount of pressure is exerted there as opposed to at the fingers, given the large surface area.

Accuracy is fundamental in sporting activities and is essential if new metrics are to provide nuanced feedback on performance. System 100 provides a high accuracy force estimate by using both pressure sensor data and the inertial data from an inertial measurement unit.

The inventors have performed numerous testing of competing devices for accuracy. These tests involved the use of the machine learning force modelling discussed herein. Firstly, a number of assumptions were made regarding a competitor's device and modelling, those being:

The competitor's device has only one pressure sensor located in use on the palm of the hand for calculating force;

The hydrostatic pressure due to depth perfectly cancelled (which is the best case scenario for the competitor's device); and The forces were calculated using a simple "Pressure=Force/Area" formula or similar (that is, using a first order polynomial with no intercept).

The resulting comparison against the competitor device (where they simply correlate forces to pressures) of the drag force estimate revealed a significant improvement when a two-sensor configuration (on the front and back of the hand) was used with a higher order polynomial, a technique only possible with system 100. Furthermore, the resulting comparison against the competitor device of the lift force estimate revealed an even more significant improvement when a two-sensor configuration (on the front and back of the hand). This is mainly due to the competitor products not taking into account the lift force, as this is extremely difficult to estimate without the modelling techniques described herein within system 100.

Furthermore, drag forces produced by a moving hand or arm have been observed to the two to three times greater than the lift forces, see: Thayer A. M., (1990). *Hand pressures as predictors of resultant and propulsive hand forces in swimming* (Doctoral dissertation, The University of Iowa, 1990). As such, the accuracy of competing products reduces by another approximately 30% due to not estimating the lift force.

Compounding these two results together, in a 100N stroke (see Tagaki et al. (2002). *Measurement of propulsion by the hand during competitive swimming* (The Engineering of Sport 4, Blackwell Publishing) pp. 631-637) the present system is calculated to have an error range of around 5.82N or so. The same calculation with respect to the competitor's device produces an error range of around 34.63N or so, the major factor in this discrepancy being the absence of measure lift force.

As such, by comparison, competitors have an error up to 600% greater than that of the system 100.

Interpretation

Throughout this specification, use of the term "element" is intended to mean either a single unitary component or a collection of components that combine to perform a specific function or purpose.

Unless specifically stated otherwise, as apparent from the following discussions, it is appreciated that throughout the specification discussions utilising terms such as "processing," "computing," "calculating," "determining", analysing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD), an organic light-emitting diode (OLED) display or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralised or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the disclosure, various features of the disclosure are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognise that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A system for formulating a performance metric of a motion of a user, the system comprising:
   a wearable sensor device including at least one pressure sensor, an inertial measurement unit (IMU), a microprocessor in communication with the at least one pressure sensor and the IMU, and at least one housing to house the microprocessor, the at least one pressure sensor and the IMU; and
   a processing unit configured to combine pressure sensor data from the pressure sensor and inertial data from the IMU, wherein the combined pressure sensor and inertial data is used to infer force data including at least one force magnitude, at least one force direction, and any one or a combination of: (i) a proportion of force magnitude that is in a forward direction, (ii) an angle of the motion, and (iii) force segmentation, wherein the at least one force magnitude or the at least one force direction are calculated from either (i) a drag force and a first lift force or (ii) a drag force, a first lift force, and a second lift force.

2. A system according to claim 1, wherein assessing the proportion of force magnitude that is in the forward direction includes augmenting pressure data from the at least one pressure sensor with inertial data from the IMU.

3. A system according to claim 1, wherein the performance metric is calculated by assessing an inverse of a time interval multiplied with a total impulse over all global axes.

4. A system according to claim 1, wherein the wearable sensor device comprises at least two pressure sensors.

5. A system according to claim 1, wherein the wearable sensor device is configured to be worn on the user's hand or wrapped around the user's palm.

6. A system according to claim 1, wherein inertial data or magnetic data from the IMU is at least partially used to devise a forward direction.

7. A system according to claim 1, wherein the IMU includes one or more from the group consisting of: an accelerometer; a gyroscope, and a magnetometer.

8. A system according to claim 1, wherein the wearable sensor device comprises a plurality of IMUs.

9. A system according to claim 1, wherein the motion is a water sports motion, the water sports motion including a swimming stroke.

10. A system according to claim 1, the system further comprising a display for graphically displaying a motion force of the user, wherein the motion force of the user is displayed in a 360° polar plot.

11. The system according to claim 1 wherein the processing unit is further configured to:
   (a) generate a model of forces based on a plurality of input variables taken from an ideal rig setup;
   (b) receive from the wearable sensor device, input data correlated with the input variables, the input data including data received from the IMU;
   (c) calculate a force estimate based on applying the wearable sensor device input data to the model of forces; and
   (d) calculate a performance metric of the motion based on the force estimate.

12. A system according to claim 11, wherein, in step (d), the processing unit is further configured for:
   inputting a forward direction of movement; rotating the force estimate relative to the forward direction of movement; and
   calculating the portion of the force estimate that is in the forward direction of movement,
   wherein the performance metric is based on this portion of the force estimate in the forward direction of movement.

13. A system according to claim 11, wherein the model is created using one or more statistical modelling techniques.

14. A system according to claim 11, wherein, after step (b), the processing unit is further configured for entering specific user variables into the model of forces.

15. A method according to claim 14, wherein the specific user variables includes one or more of the group including: hand size; finger spread; and degree of cupping.

16. The system according to claim 10, wherein the processing unit is further configured to calculate and display the motion force of a user by:
   receiving orientation data from both at least one pressure sensor and an inertial measurement unit (IMU) placed on the user;

calibrating and/or filtering the orientation data;
based on the calibrated and/or filtered orientation data, estimating at least one motion force on the user;
estimating a forward direction frame of reference of the user and rotating the estimated at least one motion force into the frame of reference;
providing a 360° plot and segmenting the plot into a plurality (n) of bins; for the rotated estimated at least one motion force, calculating a corresponding direction of motion force in a chosen plane;
based on the corresponding direction of motion force, accumulating the rotated estimated at least one motion force to the appropriate bin to produce graphical data; plotting the graphical data as a fine graph; and
transforming the line graph into a 360° polar plot graph thereby displaying the motion force of the user.

17. The system according to claim 5, wherein the wearable device comprises two or more pressure sensors, arranged such that an effect of hydrostatic pressure is removed when calculating the performance metric.

18. The system according to claim 1, wherein, when calculating the performance metric related to swimming, the combination of input data from the pressure sensor and the IMU identifies a swimmer's stroke segmentation and phase.

* * * * *